US012300846B2

(12) United States Patent
Zeng et al.

(10) Patent No.: US 12,300,846 B2
(45) Date of Patent: May 13, 2025

(54) PRESSURE RELIEF MECHANISM, BATTERY BOX, BATTERY CELL, BATTERY, PREPARATION METHOD AND APPARATUS

(71) Applicant: CONTEMPORARY AMPEREX TECHNOLOGY (HONG KONG) LIMITED, Hong Kong (CN)

(72) Inventors: Yuqun Zeng, Fujian (CN); Jianxiong Yang, Fujian (CN); Peng Wang, Fujian (CN); Zhijun Guo, Fujian (CN); Quankun Li, Fujian (CN); Zhanyu Sun, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 196 days.

(21) Appl. No.: 15/734,545

(22) PCT Filed: Jul. 10, 2020

(86) PCT No.: PCT/CN2020/101445
§ 371 (c)(1),
(2) Date: Dec. 2, 2020

(87) PCT Pub. No.: WO2022/006900
PCT Pub. Date: Jan. 13, 2022

(65) Prior Publication Data
US 2022/0013851 A1 Jan. 13, 2022

(51) Int. Cl.
*H01M 50/317* (2021.01)
*H01M 50/147* (2021.01)
(Continued)

(52) U.S. Cl.
CPC ....... *H01M 50/317* (2021.01); *H01M 50/147* (2021.01); *H01M 50/209* (2021.01);
(Continued)

(58) Field of Classification Search
CPC ............ H01M 50/317; H01M 50/147; H01M 50/209; H01M 50/3425; H01M 50/531;
(Continued)

(56) References Cited

U.S. PATENT DOCUMENTS 8,440,335 B2  5/2013  Wang et al.
9,853,266 B2  12/2017 Li et al.
(Continued)

FOREIGN PATENT DOCUMENTS

CN   101682010 A   3/2010
CN   201478351 U   5/2010
(Continued)

OTHER PUBLICATIONS

Machine translation of Deng et al., CN 204741038 U (Year: 2015).*
(Continued)

*Primary Examiner* — Jonathan G Leong
*Assistant Examiner* — Katharine A Caughron
(74) *Attorney, Agent, or Firm* — Scully, Scott, Murphy & Presser, P.C.

(57) ABSTRACT

The present application discloses a pressure relief mechanism, a battery cell and a battery. The pressure relief mechanism includes: a connecting mechanism including an aperture and a first boss, the first boss being connected to an inner wall of the aperture and extending toward an axis of the aperture; a pressure relief sheet for being actuated to release an internal pressure of the battery box when the internal pressure reaches a threshold and being arranged on a side of the first boss; a first protective sheet used to protect the pressure relief sheet and arranged on the other side of the first boss away from the pressure relief sheet; a compression ring arranged on a side of the first protective sheet away from the first boss; and a pressing structure connected to the
(Continued)

connecting mechanism and being capable of being pressed toward the axis of the aperture.

15 Claims, 10 Drawing Sheets

(51) Int. Cl.
  *H01M 50/209* (2021.01)
  *H01M 50/342* (2021.01)
  *H01M 50/531* (2021.01)
(52) U.S. Cl.
  CPC ..... *H01M 50/3425* (2021.01); *H01M 50/531* (2021.01); *H01M 2220/20* (2013.01)
(58) Field of Classification Search
  CPC ........... H01M 2220/20; H01M 50/325; H01M 50/308; H01M 50/204
  See application file for complete search history.

(56) References Cited

U.S. PATENT DOCUMENTS

| | | | |
|---|---|---|---|
| 2010/0032039 A1* | 2/2010 | Nemoto | H01M 8/2465 137/843 |
| 2012/0015219 A1 | 1/2012 | Wang et al. | |
| 2014/0315050 A1 | 10/2014 | Li et al. | |
| 2015/0125720 A1 | 5/2015 | Fujii et al. | |
| 2015/0311481 A1* | 10/2015 | Qu | H01M 50/147 429/89 |
| 2018/0254444 A1 | 9/2018 | Yoon et al. | |
| 2019/0221804 A1* | 7/2019 | Lee | H01M 50/383 |
| 2019/0237729 A1* | 8/2019 | Lee | H01M 50/103 |

FOREIGN PATENT DOCUMENTS

| | | | |
|---|---|---|---|
| CN | 101901886 A | | 12/2010 |
| CN | 203218359 U | | 9/2013 |
| CN | 104319360 A | | 1/2015 |
| CN | 204741038 U | | 11/2015 |
| CN | 204760461 U | | 11/2015 |
| CN | 105932181 A | | 9/2016 |
| CN | 205810926 U | | 12/2016 |
| CN | 106848145 A | * | 6/2017 |
| CN | 108428825 A | | 8/2018 |
| CN | 209071475 U | | 7/2019 |
| CN | 209880668 U | | 12/2019 |
| EP | 3020466 A1 | | 5/2016 |
| JP | H08124554 A | | 5/1996 |
| JP | 2016139532 A | | 8/2016 |
| JP | 2017073195 A | | 4/2017 |
| JP | 2018060880 A | | 4/2018 |
| JP | 2018137179 A | | 8/2018 |
| KR | 1043577 B1 | * | 6/2011 |
| KR | 20170037125 A | | 4/2017 |
| KR | 20190046171 A | | 5/2019 |
| RU | 2497238 C1 | | 10/2013 |
| RU | 2675595 C1 | | 12/2018 |
| WO | 2009001947 A1 | | 12/2008 |
| WO | 2017143752 A1 | | 8/2017 |
| WO | 2020063584 A1 | | 4/2020 |

OTHER PUBLICATIONS

Machine translation of Huang (CN-106848145-A). (Year: 2017).*
Office Action dated Jul. 4, 2022 received in European Patent Application No. EP 20 811 956.0.
Notice of Allowance dated Apr. 3, 2023 received in Korean Patent Application No. KR 10-2022-7026624.
Notification of Registration and Grant of Patent for Invention dated Sep. 21, 2023 received in Chinese Patent Application No. CN 202080078078.9.
Office Action dated Aug. 29, 2023 received in Russian Patent Application No. RU 2023100931/07(001869).

* cited by examiner

PRESSURE RELIEF MECHANISM, BATTERY BOX, BATTERY CELL, BATTERY, PREPARATION METHOD AND APPARATUS

CROSS-REFERENCE TO RELATED APPLICATIONS

This application is a national stage of International Application No. PCT/CN2020/101445, filed on Jul. 10, 2020, which is hereby incorporated by reference in its entirety.

TECHNICAL FIELD

The present application relates to the field of energy storage components, and in particular to a pressure relief mechanism, a battery box, a battery cell, a battery, a preparation method and an apparatus.

BACKGROUND

Lithium-ion batteries have the advantages of a small size, a high energy density, a long cycle life, and long storage time, etc., and have been widely used in some electronic devices, electric vehicles, electronic toys and other fields, for example, in mobile phones, laptops, electric bicycles, electric cars, electric airplanes, electric ships, electronic toy cars, electronic toy ships, electronic toy airplanes, electric tools, and the like.

With the continuous development of lithium-ion battery technology, higher requirements have been put forward for the safety performance of the lithium-ion battery. A pressure relief mechanism on the lithium-ion battery has an important influence on the safety performance of the lithium-ion battery. For example, when the lithium-ion battery is short circuited, overcharged, etc., it may cause the internal thermal runaway of the lithium-ion battery and in turn cause the internal air pressure to rise sharply, and at this time, the pressure relief mechanism needs to be actuated to release the internal air pressure to the outside to prevent the lithium-ion battery from exploding. Therefore, the design of the pressure relief mechanism is extremely important.

SUMMARY

The present application proposes a pressure relief mechanism, a battery box, a battery cell, a battery, a preparation method and an apparatus to improve the performance of the pressure relief mechanism on the battery.

According to a first aspect of the present application, a pressure relief mechanism for a battery box is provided, including: a connecting mechanism including an aperture and a first boss, the first boss being connected to an inner wall of the aperture and extending toward an axis of the aperture; a pressure relief sheet configured to be actuated to release an internal pressure of the battery box when the internal pressure reaches a threshold, the pressure relief sheet being arranged on a side of the first boss; a first protective sheet configured to protect the pressure relief sheet and arranged on the other side of the first boss away from the pressure relief sheet; a compression ring configured to press the first protective sheet and arranged on a side of the first protective sheet away from the first boss; and a pressing structure connected to the connecting mechanism and being capable of being pressed toward the axis of the aperture to press the compression ring.

In the pressure relief mechanism of the embodiments of the present application, a protective sheet is arranged on a side of the pressure relief sheet close to the inside of the battery box, such that when the pressure relief sheet is used on the battery box, it may prevent the pressure relief sheet from directly contacting an electrolytic solution in the battery box, thereby reducing the corrosion of the pressure relief sheet by the electrolytic solution, and also alleviating the impact of the electrolytic solution on the pressure relief sheet. In addition, during the installation process, by providing a boss on the inner wall of the aperture of the connecting mechanism, and arranging the protective sheet and the pressure relief sheet on both sides of the boss, respectively, the pressure relief mechanism may be installed at the same time on both sides to simplify the installation process. For the side where the protective sheet is installed, the protective sheet may be pressed by the compression ring, and then the compression ring is pressed by the pressing structure. The overall structure is simple and is easy to operate.

In some embodiments, the pressing structure includes at least one protrusion structure, and the at least one protrusion structure is arranged on a side surface of the connecting mechanism close to the compression ring and protrudes toward a direction away from the compression ring.

The pressing structure in the embodiments of the present application may be arranged around an edge of the aperture.

In some embodiments, the at least one protrusion structure is a plurality of protrusion structures spaced apart from each other.

By arranging as a plurality of protrusion structures spaced apart, the structure is simpler and is easier to press.

In some embodiments, a protrusion height of the protrusion structure relative to the side surface of the connecting mechanism close to the compression ring is 0.3 mm to 0.5 mm.

The dimension of the protrusion structure may be flexibly set according to actual applications, for example, according to the dimension of the compression ring.

In some embodiments, the pressing structure extends toward the axis of the aperture relative to the inner wall of the aperture after being pressed.

The pressing structure is arranged on the edge of the aperture, and after being pressed, the pressing structure extends to the axial direction of the aperture to press the compression ring.

In some embodiments, the pressing structure extends toward the axis of the aperture relative to the inner wall of the aperture after being pressed by a distance of 0.8 mm to 1 mm.

In some embodiments, a thickness of the connecting mechanism along an axial direction of the aperture is 4 mm to 5 mm.

In some embodiments, a thickness of the first boss is 1.25 mm to 1.45 mm.

In some embodiments, a thickness of the pressure relief sheet is 0.3 mm to 1 mm.

In some embodiments, a thickness of the first protective sheet is 0.3 mm to 0.5 mm.

In some embodiments, a thickness of the compression ring is 1 mm to 1.2 mm.

The dimension of each component of the pressure relief mechanism may be flexibly set according to actual applications.

In some embodiments, the connecting mechanism further includes a second boss, the second boss being connected to an outer wall of the connecting mechanism and extending away from the axis of the aperture, and the second boss being configured to install the pressure relief mechanism on the battery box.

In order to install the pressure relief mechanism on the battery box, a second boss may be provided outside the connecting mechanism of the pressure relief mechanism. The pressure relief mechanism is fixed by the second boss, which is convenient for installation. For example, when the pressure relief mechanism is installed on the bottom wall of the housing of the battery box, considering that the housing is hollow and affected by the depth, it is more convenient to fix and install via the second boss.

In some embodiments, the second boss is located at an end of the connecting mechanism close to the pressing structure.

A side of the pressure relief mechanism close to the pressing mechanism is arranged inside the battery box, and the second boss is arranged at an end close to the pressing structure, so that the end of the pressure relief mechanism close to the pressing mechanism may be substantially flush with the inner surface of the battery box, while the other end of the pressure relief mechanism may protrude from the outer surface of the battery box, so as not to affect the installation of the components, such as an internal electrode assembly, of the battery box.

In some embodiments, a thickness of the second boss is 0.6 mm to 0.9 mm.

In some embodiments, a side surface of the pressure relief sheet away from the first protective sheet and/or a side surface of the pressure relief sheet close to the first protective sheet are/is provided with a first recess, a bottom wall of the first recess is provided with a second recess, and the pressure relief sheet is configured to fracture at the second recess to release the internal pressure of the battery box when the internal pressure reaches the threshold.

In order to make the pressure relief sheet fractured more easily when thermal runaway occurs inside the battery cell, the surface of the pressure relief sheet may be additionally provided with an indentation, that is, the surface of the pressure relief sheet is provided with a recess region, and the thickness of the recess is thinner such that the pressure relief mechanism may be fractured at the recess to achieve more precise directional fracture and exhaust. Further, considering the ease of installation, the connection between the pressure relief sheet and the connecting mechanism should not be designed to be too thin. Therefore, a first recess may be provided in the pressure relief sheet, and a second recess may be provided in the first recess, such that the position outside the recess region may be thicker and the thickness within the second recess may be thinner, which are more convenient for processing.

In some embodiments, the first recess is arranged on a side surface of the pressure relief sheet away from the first protective sheet.

Considering that the side of the pressure relief sheet close to the first protective sheet faces the inside of the battery box during installation, if the recess is provided on this side, since there is an electrolytic solution in the battery box, if the sealing of the first protective sheet is not good enough, the electrolytic solution may accumulate in the recess and corrode the recess part, and thus it may cause the pressure relief mechanism to fracture prematurely. Therefore, the recess is generally provided on the side of the pressure relief sheet away from the first protective sheet, which may slow down the corrosion by the electrolytic solution.

In some embodiments, a thickness of the pressure relief sheet at the second recess is 0.08 mm to 0.15 mm.

In some embodiments, a depth of the first recess is 0.3 mm.

The thickness of each recess on the pressure relief sheet may be set according to the thickness of the pressure relief sheet.

In some embodiments, the pressure relief mechanism further includes: a second protective sheet configured to protect the pressure relief sheet, the second protective sheet being installed on the connecting mechanism and being located at a side of the pressure relief sheet away from the first boss and covering the pressure relief sheet.

The second protective sheet provided on a side of the pressure relief sheet away from the inside of the battery box may protect the pressure relief sheet from being affected by the external components.

In some embodiments, a thickness of the second protective sheet is 0.1 mm to 0.2 mm.

In some embodiments, a gap is provided between a surface of the second protective sheet toward the pressure relief sheet and a surface of the pressure relief sheet toward the second protective sheet.

Since the pressure relief sheet needs an opening space when exhausting, a gap needs to be provided between the second protective sheet and the pressure relief sheet. This gap is used for opening the pressure relief sheet, and may also prevent the pressure relief sheet from being worn when the second protective sheet is attached to the pressure relief sheet, thereby further protecting the pressure relief sheet.

In some embodiments, the gap is greater than or equal to 0.5 mm.

The size of the gap between the second protective sheet and the pressure relief sheet may be set according to actual applications.

In some embodiments, the pressure relief mechanism further includes: a ring spacer being arranged between the first protective sheet and the first boss.

By adding a ring spacer between the first protective sheet and the first boss, the wear on the first protective sheet may be reduced, which is also more beneficial to the sealing of the first protective film to the pressure relief sheet, further reducing the possibility of the electrolytic solution contact with the pressure relief sheet.

In some embodiments, a thickness of the ring spacer is 0.2 mm to 0.4 mm.

The dimension of the ring spacer may be set according to actual applications.

According to a second aspect of the present application, a battery box is provided, including: a housing, a first wall of the housing being provided with a through hole; and a pressure relief mechanism as described in the first aspect and any of possible implementations of the first aspect, the pressure relief mechanism being arranged on the first wall through the connecting mechanism and being arranged corresponding to the through hole, for being actuated to release the internal pressure of the battery box when the internal pressure reaches the threshold.

In some embodiments, the pressing structure is closer to the inside of the housing than the pressure relief sheet.

The first protective sheet of the pressure relief mechanism is arranged closer to the inside of the battery box, such that the first protective sheet may protect the pressure relief sheet, relieve the corrosion of the pressure relief sheet by the electrolytic solution in the battery box, also reduce the impact of the electrolytic solution on the pressure relief sheet to damage the pressure relief sheet during the vibration and impact, and in turn cause the pressure relief sheet to be destroyed prematurely.

In some embodiments, a third recess is provided on a side surface of the first wall close to the inside of the housing, and the through hole is provided on a bottom wall of the third recess; and the connecting mechanism further includes a second boss, the second boss being connected to an outer wall of the connecting mechanism and extending away from the axis of the aperture, the second boss being located at an end of the connecting mechanism close to the pressing structure, and the second boss being installed on the bottom wall of the third recess such that the pressure relief mechanism is at least partially contained in the through hole.

A recess is provided on the inner wall of the housing of the battery box, such that the second boss of the pressure relief mechanism is installed on the bottom wall of the recess to realize the fixation of the pressure relief mechanism, thereby ensuring that the surface of the pressure relief mechanism inside the battery box is substantially flush with the inner surface of the battery box, so as not to affect the installation of the components, such as an electrode assembly inside the battery box.

In some embodiments, the housing is a hollow cuboid and has an opening at an end.

In some embodiments, the first wall is a bottom wall of the housing, and the bottom wall of the housing is a wall opposite the opening of the housing.

Considering that the electrode terminals are generally arranged on the cover plate, if the pressure relief mechanism is also arranged on the cover plate, when thermal runaway occurs inside the battery cell, the pressure relief mechanism is fractured, and a liquid or solid combustible material, which may also contain a conductive material, will be sprayed out while the internal gas pressure of the battery cell is released, resulting in short circuit between the electrode terminals. Moreover, considering that the electrode terminals are generally directed upward, that is, toward a passenger, when the battery is installed in a vehicle, if the pressure relief mechanism is installed on the same side of the electrode terminals, gas flow and other materials released after the pressure relief mechanism is fractured will be discharged upward, which may cause burn or scald to the passenger, increasing the risk of the passenger. Therefore, in the embodiments of the present application, the pressure relief mechanism is arranged on the bottom wall of the housing, and the pressure relief mechanism exhausts downward, which may solve the above-mentioned problems to a certain extent.

In some embodiments, a thickness of the bottom wall of the housing is 1.5 mm to 2.5 mm.

In some embodiments, the battery box includes: a cover plate covering and closing the opening of the housing.

In some embodiments, the battery box further includes: electrode terminals, the electrode terminals including a positive electrode terminal and a negative electrode terminal that are both arranged on the cover plate.

According to a third aspect of the present application, a battery cell is provided, including: the battery box as described in the second aspect and any of the possible implementations of the second aspect; and an electrode assembly, the electrode assembly being arranged in the battery box.

In some embodiments, the housing is a hollow cuboid and has an opening at an end.

In some embodiments, the battery cell further includes: a backing plate, the backing plate being located between the electrode assembly and a bottom wall of the housing, and the bottom wall of the housing being a wall of the housing opposite the opening of the housing.

In some embodiments, the first wall is the bottom wall of the housing, and the backing plate is provided with an avoidance zone corresponding to the pressure relief mechanism, such that the backing plate does not block the pressure relief mechanism.

When the pressure relief mechanism is arranged on the bottom wall, since the bottom wall is also provided with a backing plate, when thermal runaway occurs inside the battery cell, the backing plate may prevent the gas from breaking through the pressure relief mechanism. Therefore, in order to make the pressure relief mechanism fractured more easily, a part of the region of the backing plate may be removed to form an avoidance zone, that is, a through hole is provided on the backing plate where the pressure relief mechanism is located, such that the backing plate does not block the pressure relief mechanism.

According to a fourth aspect of the present application, a battery is provided, including: a plurality of battery cells, the plurality of battery cells including at least one battery cell as described in the third aspect and any of the possible implementations of the third aspect; a bus component configured to achieve electrical connection among the plurality of battery cells; and a case configured to contain the plurality of battery cells and the bus component.

According to a fifth aspect of the present application, a power consumption device is provided, including a battery as described in the fourth aspect.

The power consumption device may be a vehicle, a ship or a spacecraft.

According to a sixth aspect of the present application, a method for preparing a pressure relief mechanism for a battery box is provided, the method including: providing a connecting mechanism, the connecting mechanism including an aperture and a first boss, the first boss being connected to an inner wall of the aperture and extending toward an axis of the aperture; providing a pressure relief sheet configured to be actuated to release an internal pressure of the battery box when the internal pressure reaches a threshold, the pressure relief sheet being arranged on a side of the first boss; providing a first protective sheet configured to protect the pressure relief sheet and arranged on the other side of the first boss away from the pressure relief sheet; providing a compression ring configured to be press the first protective sheet and arranged on a side of the first protective sheet away from the first boss; and providing a pressing structure connected to the connecting mechanism and being capable of being pressed toward the axis of the aperture to press the compression ring.

In some embodiments, the pressing structure includes at least one protrusion structure, and the at least one protrusion structure is arranged on a side surface of the connecting mechanism close to the compression ring and protrudes toward a direction away from the compression ring.

In some embodiments, the pressing structure extends toward the axis of the aperture relative to the inner wall of the aperture after being pressed.

In some embodiments, the connecting mechanism further includes a second boss, the second boss being connected to an outer wall of the connecting mechanism and extending away from the axis of the aperture, and the second boss being configured to install the pressure relief mechanism on the battery box.

It should be understood that the method for preparing a pressure relief mechanism in the embodiments of the present application may be used to prepare the pressure relief mechanism in the first aspect and any of possible implementations of the first aspect.

According to a seventh aspect of the present application, an apparatus for preparing a pressure relief mechanism for a battery box is provided, the apparatus including a provision module configured to: provide a connecting mechanism, the connecting mechanism including an aperture and a first boss, the first boss being connected to an inner wall of the aperture and extending toward an axis of the aperture; provide a pressure relief sheet configured to be actuated to release an internal pressure of the battery box when the internal pressure reaches a threshold, the pressure relief sheet being arranged on a side of the first boss; provide a first protective sheet configured to protect the pressure relief sheet and arranged on the other side of the first boss away from the pressure relief sheet; provide a compression ring configured to press the first protective sheet and arranged on a side of the first protective sheet away from the first boss; and provide a pressing structure connected to the connecting mechanism and being capable of being pressed toward the axis of the aperture to press the compression ring.

In some embodiments, the pressing structure includes at least one protrusion structure, and the at least one protrusion structure is arranged on a side surface of the connecting mechanism close to the compression ring and protrudes toward a direction away from the compression ring.

In some embodiments, the pressing structure extends toward the axis of the aperture relative to the inner wall of the aperture after being pressed.

In some embodiments, the connecting mechanism further includes a second boss, the second boss being connected to an outer wall of the connecting mechanism and extending away from the axis of the aperture, and the second boss being configured to install the pressure relief mechanism on the battery box.

It should be understood that the apparatus for preparing a pressure relief mechanism in the embodiments of the present application may be used to execute the method in the sixth aspect or any of possible implementations of the sixth aspect. Specifically, the apparatus includes a unit for executing the method in the sixth aspect or any of possible implementations of the sixth aspect.

BRIEF DESCRIPTION OF THE DRAWINGS

The accompanying drawings described herein are used to provide a further understanding of the present application and constitute a part of the present application. The exemplary embodiments and descriptions of the present application are used to explain the present application and do not constitute an undue limitation to the present application. In the drawings.

DESCRIPTION OF EMBODIMENTS

Figure 1:
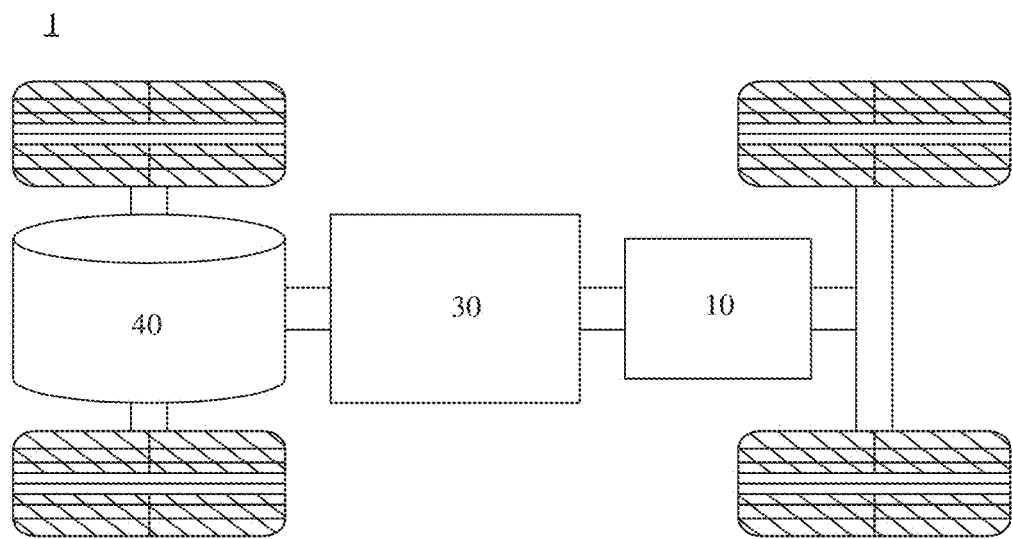
FIG. 1 is a schematic contour diagram of some embodiments of a vehicle using a battery of the present application.

In order to make the objectives, technical solutions and advantages of embodiments of the present application clearer, the technical solutions in embodiments of the present application will be clearly and completely described below with reference to the accompanying drawings in the embodiments of the present application. Apparently, the described embodiments are some of, rather than all of, the embodiments of the present application. All the other embodiments obtained by those of ordinary skill in the art based on the embodiments of the present application without any inventive effort shall fall within the scope of protection of the present application.

Unless otherwise defined, all technical and scientific terms used herein have the same meaning as those commonly understood by those skilled in the art to which the present application belongs. The terms used in the specification herein are merely for the purpose of describing specific embodiments, but are not intended to limit the present application. The terms "comprise" and "having" and any variations thereof in the specification and claims of the present application as well as the foregoing description of the accompanying drawings are intended to cover non-exclusive inclusions. The terms "first", "second" or the like in the specification and the claims of the present application as well as the above drawings are used to distinguish different objects, rather than to describe a specific order or primary-secondary relationship.

The phrase "embodiments" referred to herein means that specific features, structures, or characteristics described in conjunction with the embodiments may be included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described herein may be combined with another embodiment.

The term "and/or" in this text is only an association relationship describing associated objects, which indicates that there may be three relationships. For example, A and/or B may indicate the following three situations: A exists alone, both A and B exist, and B exists alone. In addition, the character "/" in this text generally indicates that the associated objects before and after the character are in an "or" relationship.

In the present application, "a plurality of" means two or more (including two). Similarly, "a plurality of groups" means two or more groups (including two groups), and "a plurality of sheets" means two or more sheets (including two sheets).

The pressure relief mechanism, the battery cell, and the battery including a plurality of battery cells described in the embodiments of the present application are all applicable to various apparatuses using a battery, such as mobile phones, portable devices, laptops, electromobiles, electric vehicles, ships, spacecrafts, electronic toys, electric tools and the like. For example, the spacecrafts include airplanes, rockets, space shuttles, spaceships and the like; the electronic toys include fixed or mobile electronic toys, such as game consoles, electric car toys, electric ship toys, electric aircraft toys and the like; and the electric tools include metal cutting power tools, grinding power tools, assembly power tools and railway power tools, such as electric drills, electric grinders, electric wrenches, electric screwdrivers, electric hammers, electric impact drills, concrete vibrators and electric planers.

The pressure relief mechanism, the battery cell, and the battery including a plurality of battery cells described in the embodiments of the present application are not only applicable to the devices described above, but also applicable to all devices using a battery, but for brevity, the following embodiments are all described taking an electric vehicle as an example.

For example, as shown in FIG. 1, which is a schematic structural diagram of a vehicle 1 according to an embodiment of the present application, the vehicle 1 may be a fuel vehicle, a gas vehicle or a new-energy vehicle. The new-energy vehicle may be a battery electric vehicle, a hybrid vehicle, an extended-range vehicle, etc. A battery 10 may be arranged inside the vehicle 1. The battery 10 may be a battery pack or a battery module. For example, the battery 10 may be arranged at the bottom or the head or the tail of the vehicle 1. A controller 30 and a motor 40 may also be arranged inside the vehicle 1. The battery 10 may be used to power the vehicle 1. For example, the battery 10 may serve as an operation power supply of the vehicle 1 for the circuitry of the vehicle 1, for example, for the working power demand of the vehicle 1 during startup, navigation, and running. In another embodiment of the present application, the battery 10 can be used not only as an operation power supply of the vehicle 1, but also as a driving power supply of the vehicle 1 to provide driving power for the vehicle 1 instead of or partially instead of fuel or natural gas.

Figure 2:
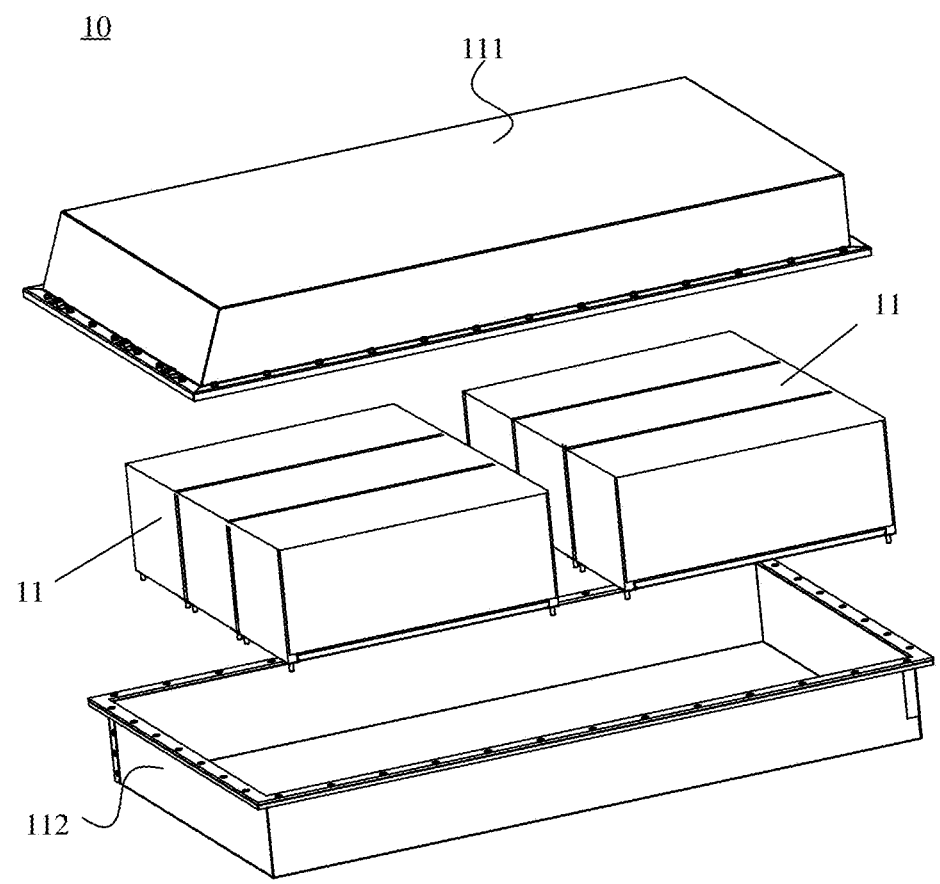
FIG. 2 is a schematic structural diagram of some embodiments of the battery of the present application.

In order to meet different power demands, the battery 10 may include one or more battery modules (or may also be referred to as battery units), wherein a plurality of battery modules may be in a series connection, or in a parallel connection, or in a series-parallel connection which refers to a combination of series connection and parallel connection. For example, as shown in FIG. 2, which is a schematic structural diagram of a battery 10 according to another embodiment of the present application, the battery 10 includes a first cover 111, a second cover 112, and a plurality of battery modules 11, wherein the shapes of the first cover 111 and the second cover 112 may be determined according to the shape of the combination of the one or more battery modules 11. Both the first cover 111 and the second cover 112 have an opening. For example, each of the first cover 111 and the second cover 112 may be a hollow cuboid and has only one face as an opening surface, that is, this face does not have a housing wall so as to communicate the inside and the outside of the housing. The first cover 111 and the second cover 112 are fastened to each other at the openings to form a closed shell of the battery 10. One or more battery modules 11 are in a parallel connection or in a series connection or in a series-parallel connection to each other, and then are placed in the shell formed after the first cover 111 and the second cover 112 are fastened together.

In another embodiment of the present application, when the battery 10 includes one battery module 11, the battery module 11 is placed in the shell formed after the first cover 111 and the second cover 112 are fastened together.

The electricity generated by the one or more battery modules 11 is drawn out through the shell via an electrically conductive mechanism (not shown).

In addition, the battery 10 may further include other structures, which will not be described in detail herein. For example, the battery 10 may further include a bus component for achieving electrical connection among a plurality of battery cells (not shown). For another example, the battery 10 may further include a cooling component for containing a cooling medium to cool one or more battery units 11, but the embodiments of the present application are not limited thereto.

Figure 3:
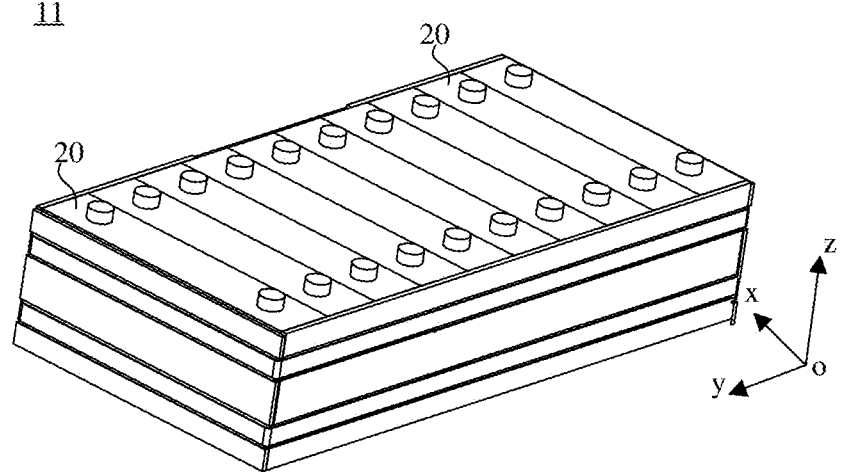
FIG. 3 is a schematic structural diagram of some embodiments of a battery module in the battery of the present application.

According to the different power demands, the battery module 11 may include one or more battery cells. For example, as shown in FIG. 3, one battery module 11 may include a plurality of battery cells 20, and the plurality of battery cells 20 may be connected in a series connection, in a parallel connection or in a parallel-series connection to achieve larger capacity or power. Moreover, the number of the battery cells 20 included in one battery module 11 may be set to any value. Among them, each battery cell 20 may include a lithium-ion secondary battery, a lithium-ion primary battery, a lithium sulfur battery, a sodium lithium-ion battery, or a magnesium-ion battery, but is not limited thereto. The battery cell 20 may be in the shape of a cylinder, a flat body or a cuboid, or in other shapes.

In another embodiment of the present application, a plurality of battery cells 20 may be stacked together, and the plurality of battery cells 20 are in a series connection, in a parallel connection or in a parallel-series connection. In another embodiment of the present application, each battery cell 20 may be square, cylindrical or in other shapes.

For each battery cell 20, it may include a battery box and an electrode assembly arranged in the battery box, wherein the battery box may include two parts: a housing and a cover plate. The housing may be a hollow cuboid, a cube, or a cylinder. One of the surfaces of the housing has an opening such that the electrode assembly may be placed in the housing; and the cover plate is connected to the housing at the opening of the housing to form a closed battery box of the battery cell 20, and the housing may be filled with an electrolytic solution.

In addition, the battery box also includes two electrode terminals, which are generally arranged on the cover plate and connected to the electrode assembly. A pressure relief mechanism may also be arranged on the flat plate surface of the cover plate, and the pressure relief mechanism may be a part of the flat plate surface of the cover plate 212, or may be welded to the flat plate surface of the cover plate. In a normal state, the pressure relief mechanism is hermetically combined with the cover plate, that is, the cover plate is connected to the housing at the opening of the housing to form the battery box of the battery cell 20, and the space formed by the battery box is hermetically sealed. In the battery box, when the battery cell 20 generates too much gas, the expansion of the gas causes the air pressure in the battery box to rise beyond a preset value, the pressure relief mechanism may crack, causing the inside and the outside of the battery box to communicate with each other, and thus the gas is released outward through the cracking of the pressure relief mechanism, thereby reducing the possibility of explosion.

In an existing battery cell, a pressure relief mechanism is generally arranged on a cover plate and is located on the same side as an electrode terminal, such that when thermal runaway occurs inside the battery cell, the pressure relief mechanism is fractured, and a liquid or solid combustible material, which may also contain a conductive material, will be sprayed out while the internal gas pressure of the battery cell is released, resulting in short circuit between the electrode terminals. Moreover, considering that the electrode terminals are generally directed upward, that is, toward a passenger, when the battery is installed in a vehicle, if the pressure relief mechanism is installed on the same side of the electrode terminals, gas flow and other materials released after the pressure relief mechanism is fractured will be discharged upward, which may cause burn or scald to the passenger, increasing the risk of the passenger. Therefore, it can be conceived that the pressure relief mechanism is installed at other positions, for example, installed on the housing below the cover plate, such as installed on the bottom wall of the housing, so as to solve the problems mentioned above.

However, if the pressure relief mechanism is installed on the housing, since the housing has a hollow structure with an opening at one end, and the pressure relief mechanism is generally sheet-shaped, it may be inconvenient to install the pressure relief mechanism on the housing, especially when the pressure relief mechanism is installed on the bottom wall of the housing. Due to the limitation of the depth of the housing, it is difficult to directly weld the sheet-shaped pressure relief mechanism to the bottom wall. In addition, the strength of the pressure relief mechanism should also be considered. For example, when the pressure relief mechanism is installed on the housing, the pressure of the internal electrode assembly on the pressure relief mechanism needs to be considered. For example, for the battery installed in the vehicle, there will be bumps during the driving of the vehicle, so the electrode assembly will exert pressure on the side wall and the bottom wall of the housing, and thus the pressure relief mechanism needs to have sufficient strength. For another example, since the electrolytic solution is provided in the housing, it is also necessary to consider the corrosion of the pressure relief mechanism by the electrolytic solution.

Therefore, the embodiments of the present application provide a pressure relief mechanism, which can solve the above problems regarding installation and strength.

Figure 4:
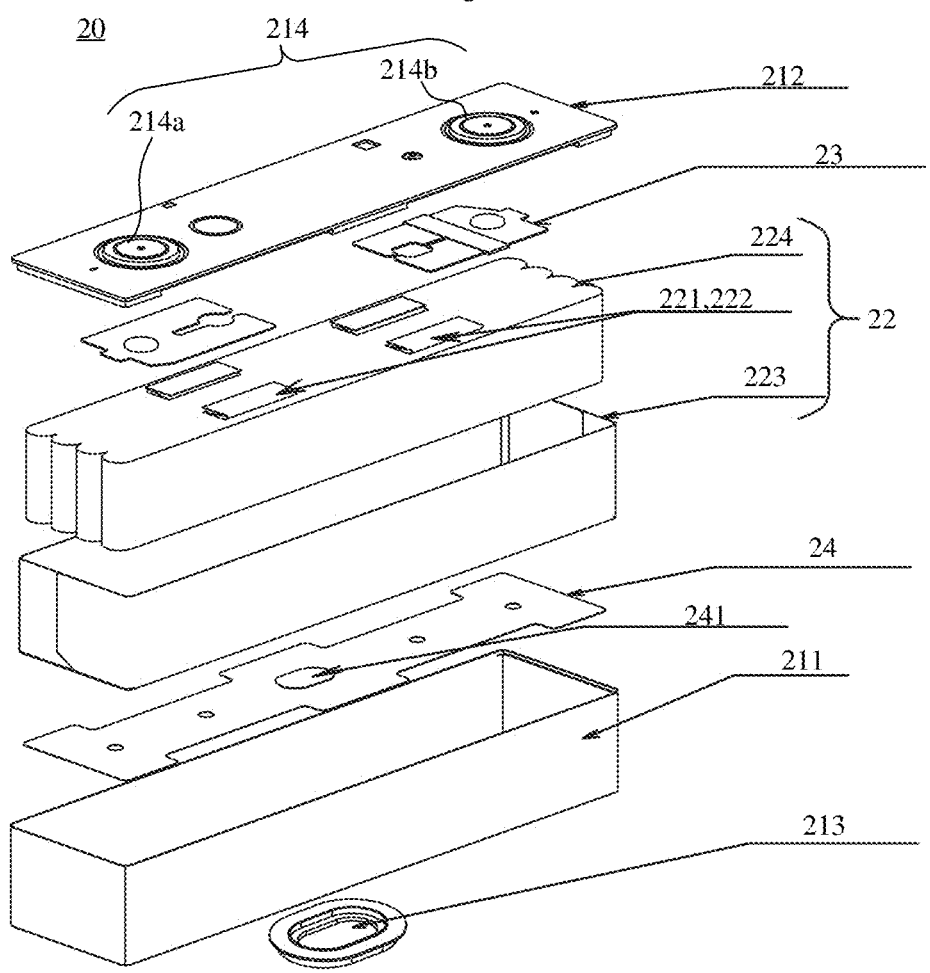
FIG. 4 is an exploded view of some embodiments of a battery cell of the present application.

Specifically, still taking the embodiments shown in FIGS. 1-3 as examples, FIG. 4 shows another embodiment of the battery cell 20 of the embodiments of the present application. As shown in FIG. 4, the battery cell 20 includes a battery box (not shown), one or more electrode assemblies 22, and a connecting member 23, wherein the battery box in the embodiments of the present application includes a housing 211 and a cover plate 212.

Specifically, as shown in FIG. 4, the shape of the housing 211 included in the battery box of the battery cell 20 may be determined according to the shape of the one or more electrode assemblies 22 after being combined, for example, the housing 211 may be a hollow cuboid or cube or cylinder, and one of faces of the housing 211 has an opening such that the one or more electrode assemblies 22 may be placed in the housing 211. For example, when the housing 211 is a hollow cuboid or a cube, one of the planes of the housing 211 is an opening surface, that is, the plane does not have a housing wall so as to cause communication between the inside and the outside of the housing 211. When the housing 211 may be a hollow cylinder, a circular side surface of the housing 211 is an opening surface, that is, the circular side surface does not have a housing wall so as to cause communication between the inside and the outside of the housing 211. The cover plate 212 is connected to the housing 211 at the opening of the housing 211 to form a closed battery box placing the battery cell 20, and the electrolytic solution is filled in the housing 211.

As shown in FIG. 4, the battery box of the battery cell 20 may further include two electrode terminals 214, and the two electrode terminals 214 may be arranged on the cover plate 212. The cover plate 212 is generally in the shape of a flat plate, and the two electrode terminals 214 are located on the flat plate surface of the cover plate 212 and pass through the flat plate surface of the cover plate 212. The two electrode terminals 214 are a positive electrode terminal 214a and a negative electrode terminal 214b, respectively. Each electrode terminal 214 is provided with a connecting member 23 correspondingly, or the connecting member may also be referred to as a current collecting member 23 or a copper-aluminum adapter plate 23, which is located between the cover plate 212 and the electrode assembly 22.

As shown in FIG. 4, each electrode assembly 22 may specifically include at least one positive electrode tab 221 and at least one negative electrode tab 222. In addition, the electrode assembly 22 may also include a bare cell and an insulation sheet wrapping the bare cell, with the specific positions of the positive electrode tab 221 and the negative electrode tab 222 being not distinguished in FIG. 4. The positive electrode tab 221 of the one or more electrode assemblies 22 is connected to one electrode terminal via a connecting member 23. The negative electrode tab 222 of the one or more electrode assemblies 22 is connected to another electrode terminal via another connecting member 23. For example, the positive electrode terminal 214a is connected to the positive electrode tab 221 via a connecting member 23, and the negative electrode terminal 214b is connected to the negative electrode tab 222 via another connecting member 23.

In the battery cell 20, according to the practical requirements, single or multiple electrode assemblies 22 may be provided. As shown in FIG. 4, at least two independent electrode assemblies 22 are provided in the battery cell 20.

In this battery cell 20, the electrode assembly 22 may have a winding structure or may have a laminated structure, and the embodiments of the present application are not limited thereto.

In addition, as shown in FIG. 4, the battery cell 20 may also include a backing plate 24. The backing plate 24 is located between the electrode assembly 22 and the bottom wall of the housing 211, may support the electrode assembly 22, and may also effectively prevent the electrode assembly 22 from interfering with round corners around the bottom wall of the housing 211. The shape of the backing plate 24 in the embodiments of the present application may be arranged according to actual applications. For example, the backing plate 24 may be arranged in a rectangular shape consistent with the shape of the bottom wall of the housing 211, or, as shown in FIG. 4, may also be arranged in other shapes. In addition, the backing plate 24 may be provided with one or more through holes, for example, a plurality of through holes arranged uniformly or symmetrically may be provided such that the spaces of upper and lower surfaces of the backing plate 24 can be communicated, and the gas, generated inside the electrolytic solution and the electrode assembly 22, and the electrolytic solution may freely pass through the backing plate 24 to facilitate the guiding of liquid and gas.

The backing plate 24 has a thickness generally set to 0.3-5 mm, and is preferably an insulation component, but may also not be insulated. For example, the material of the backing plate 24 may be PP, PE, PET, PPS, Teflon, stainless steel, aluminum, and other materials that are resistant to electrolytic solutions and are insulating, wherein the plastic material, such as PP, PE, PET or PPS, may be a fireproof material, and the surface of the metal material, such as aluminum or stainless steel, may be anodized for insulation.

In addition, the battery cell 20 in the embodiments of the present application may also include other components. For example, the battery cell 20 may also include a top cover patch, a sealing nail and a plastic nail, wherein the top cover patch, the sealing nail and the plastic nail may be installed on the cover plate 212. In addition, the battery cell 20 may also include a blue film, which is arranged on the outer surface of the housing 211 of the battery to achieve the functions of insulation and protection of the battery cell, but the embodiments of the present application are not limited thereto.

In the embodiments of the present application, as shown in FIG. 4, the battery box of the battery cell 20 further includes a pressure relief mechanism 213, the pressure relief mechanism 213 being configured to be actuated to release an internal pressure of the battery box 21 when the internal pressure reaches a threshold. In a normal state, the pressure relief mechanism 213 is a part of the battery box 21 of the battery cell 20, and the space formed by the housing 211 and the cover plate 212 is hermetically sealed. However, when the battery cell 20 generates too much gas, the expansion of the gas causes the air pressure in the battery box 21 to rise beyond the preset value, the pressure relief mechanism 213 may crack, causing the inside and the outside of the battery box 21 to communicate with each other, and thus the gas is released outward through the cracking of the pressure relief mechanism 213, thereby reducing the possibility of explosion.

The pressure relief mechanism 213 in the embodiments of the present application may be located at the bottom wall of the housing 211, and the bottom wall of the housing 211 is opposite the opening of the housing 211. For example, the bottom wall of the housing 211 may be provided with a through hole, and the pressure relief mechanism 213 is arranged at the through hole. However, in addition to installing the pressure relief mechanism 213 on the bottom wall of the housing 211 as shown in FIG. 4, the pressure relief mechanism 213 may also be installed on any side wall of the housing 211. The side wall of the housing 211 is adjacent to the opening of the housing 211; or the pressure relief mechanism 213 may also be installed on the cover plate 212. The embodiments of the present application are not limited thereto.

Figure 5:
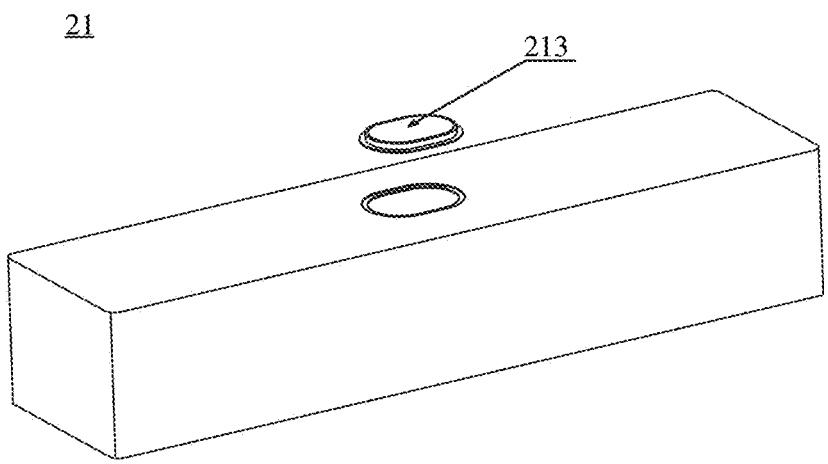
FIG. 5 is an exploded view of some embodiments of a battery box with a pressure relief mechanism of the present application.
Figure 6:
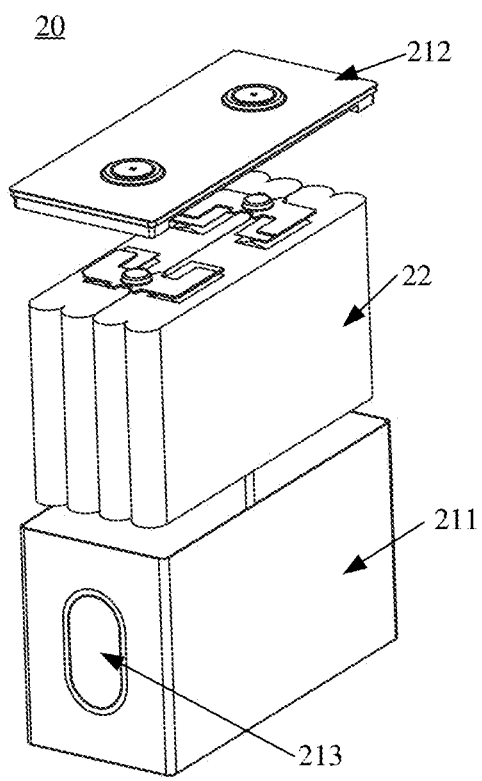
FIG. 6 is an exploded view of other embodiments of the battery box with a pressure relief mechanism of the present application.

Specifically, here the housing 211 shown in FIG. 4 being a hollow cuboid is taken as an example for description. Correspondingly, the battery box is also a hollow cuboid. For example, FIG. 5 shows a schematic diagram of the battery box 21. As shown in FIG. 5, since a cuboid (i.e., hexahedral) battery box 21 is taken as an example, the battery box 21 includes six walls (or six faces). FIG. 5 shows any three adjacent walls of the battery box 21, and the pressure relief mechanism 213 in the embodiments of the present application may be provided on any wall of the battery box 21. Here, any one of the walls is referred to as a first wall, and the first wall may be provided with a through hole. The pressure relief mechanism 213 is disposed at a corresponding position of the through hole on the first wall. For example, the pressure relief mechanism 213 may be partially contained in the through hole. For example, FIG. 4 shows an example in which the pressure relief mechanism 213 is arranged on the bottom wall of the housing 211, that is, the first wall in FIG. 5 may be the bottom wall of the housing 211. For another example, as shown in FIG. 6, the pressure relief mechanism 213 may also be arranged on any side wall of the housing 211, that is, the first wall in FIG. 5 may be the side wall of the housing 211, but the embodiments of the present application are not limited thereto.

In the embodiments of the present application, the battery box 21 is a cuboid, and the housing 211 has four side walls, two side walls with a larger area and two side walls with a smaller area. For the case where the pressure relief mechanism 213 is arranged on the side wall of the housing 211, the pressure relief mechanism 213 is generally arranged on a side wall with a smaller area, for example, as shown in FIG. 6. Considering that when a plurality of battery cells are assembled into a battery, for example, as the installation method shown in FIG. 3, for the cuboid battery cell, the placement between two adjacent battery cells is generally that the walls with a larger area in the side walls of the housings of the two battery cells are in contact with each other. Therefore, if the pressure relief mechanism 213 is arranged on the side wall with a larger area, the opening of the pressure relief mechanism 213 will be affected when a plurality of battery cells are tightly arranged to be assembled into a battery. For example, it is necessary to leave a space between the battery cells for the pressure relief mechanism 213 to open, which is not conducive to the installation of a plurality of battery cells. Therefore, installing the pressure relief mechanism 213 on a side wall with a smaller area is beneficial to the placement of a plurality of battery cells and may further improve the energy density of the battery.

For ease of description, the following description mainly takes the pressure relief mechanism 213 arranged on the bottom wall of the housing 211 as an example.

Figure 7:
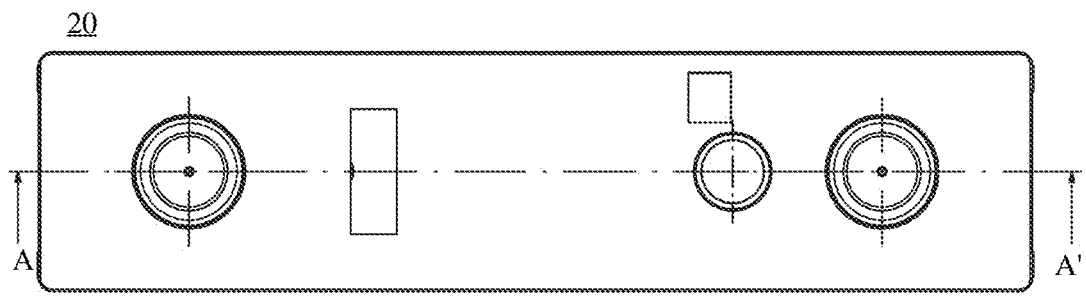
FIG. 7 is a top view of the battery cell of the present application.
Figure 8:
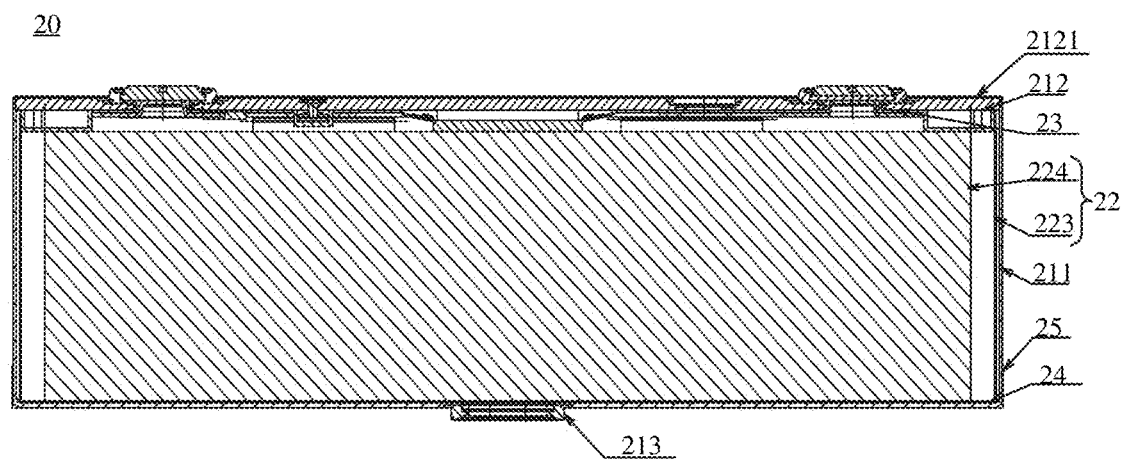
FIG. 8 is a cross-sectional view taken in a direction A-A' in FIG. 9.

FIG. 7 is a top view of the battery cell 20, that is, FIG. 7 shows the surface of the cover plate 212 of the battery cell 20, and FIG. 8 is a cross-sectional view of the battery cell 20 in a direction A-A' shown in FIG. 7. As shown in FIG. 8, after the battery cell 20 is assembled, the housing 211 is internally provided with an electrode assembly 224 and an insulation sheet 223 wrapping the electrode assembly 224. A backing plate 24 is arranged on the inner surface of the bottom wall of the housing 211 below the electrode assembly 224, the cover plate 212 covers and closes the opening of the housing 211, and the pressure relief mechanism 213 is located below the battery box 21, that is, the bottom wall of the housing 211.

Considering that the thickness of each component of the pressure relief mechanism 213 in the embodiments of the present application can be set according to actual applications, the overall thickness of the pressure relief mechanism 213 may be thicker. When the pressure relief mechanism is installed on the battery box 21, for example, as shown in FIG. 8, there may be a part of the pressure relief mechanism 213 that protrudes from the outer surface of the bottom of the entire battery cell 10.

Specifically, the thickness of the pressure relief mechanism 213 in the embodiments of the present application is generally thicker and the housing 211 is thinner, for example, the thickness of the bottom wall of the housing 22 is generally 1.5 mm to 2.5 mm, for example, it may be 1.5 mm, 2 mm or 2.5 mm, thus the battery cell 20 after the pressure relief mechanism 213 is installed may be as shown in FIG. 8, and a part of the pressure relief mechanism 213 may protrude from the outer surface of the bottom of the entire battery cell 10. Therefore, when the battery cell 20 shown in FIG. 8 is assembled into the battery 10, it is necessary to provide an avoidance zone for the pressure relief mechanism 213 protruding from the bottom of the battery cell 20. In the embodiments of the present application, "mm" means millimeter.

For example, suppose that when the battery cell 20 is assembled into the battery 10, a certain component needs to be provided under the battery cell 20, for example, a cooling plate may be provided to cool the battery cell 20, or a bottom protective plate may also be provided. The embodiments of the present application are not limited thereto. For the components located below the battery cell 20, the battery cell 20 may be installed by providing a recessed avoidance zone on the surface. For example, if a cooling plate is provided under the battery cell 20, a recess or a through hole may be provided in the region corresponding to the pressure relief mechanism 213 on the cooling plate, such that the pressure relief mechanism 213 may be contained in the recess or the through hole compared with the protruding part of the bottom outer surface of the battery cell 20, thereby saving the space.

Figure 9:
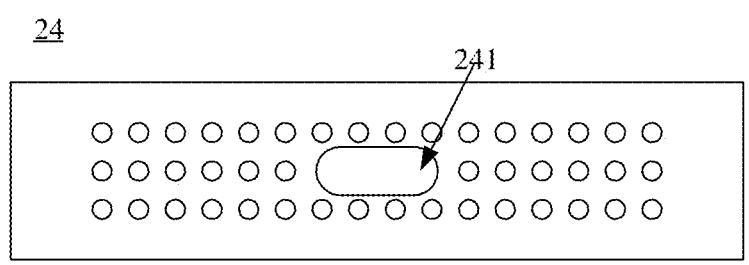
FIG. 9 is a schematic diagram of some embodiments of a backing plate of the present application.

In addition, considering that when the pressure relief mechanism 213 is arranged on the bottom wall of the housing 211, the backing plate 24 located on the bottom wall will cover the pressure relief mechanism 213, which may cause the backing plate 24 to prevent the gas from breaking through the pressure relief mechanism 213, so an avoidance zone can be provided on the backing plate 24 to ensure that the backing plate 24 does not block the pressure relief mechanism 213. Specifically, as shown in FIG. 9, the cuboid backing plate 24 is taken as an example for description. A part of the region of the backing plate 24 may be removed, that is, at the position where the pressure relief mechanism 213 is located, a through hole is correspondingly provided on the backing plate 24 as the avoidance zone 241 so that the backing plate 24 does not block the pressure relief region. For example, as shown in FIG. 9, the backing plate 24 is provided with an avoidance zone 241 corresponding to the pressure relief mechanism 213 so that the backing plate 24 does not block the pressure relief mechanism 213, wherein the shape of the avoidance zone 241 on the backing plate 24 is generally consistent with the shape of the side surface of the pressure relief mechanism 213 close to the inside of the housing 211. FIG. 9 is only an example, and the embodiments of the present application are not limited thereto.

Further, in order to prevent the backing plate 24 from blocking the pressure relief mechanism 213 at all, the area of the avoidance zone 241 of the backing plate 24 is generally set to be larger than the area of the pressure relief mechanism 213. Alternatively, considering that the pressure relief mechanism 213 in the embodiments of the present application is disposed in the through hole of the bottom wall of the housing 211, the area of the avoidance zone 241 of the backing plate 24 is larger than the area of the through hole of the bottom wall of the housing 211. However, the embodiments of the present application are not limited thereto.

Figure 10:
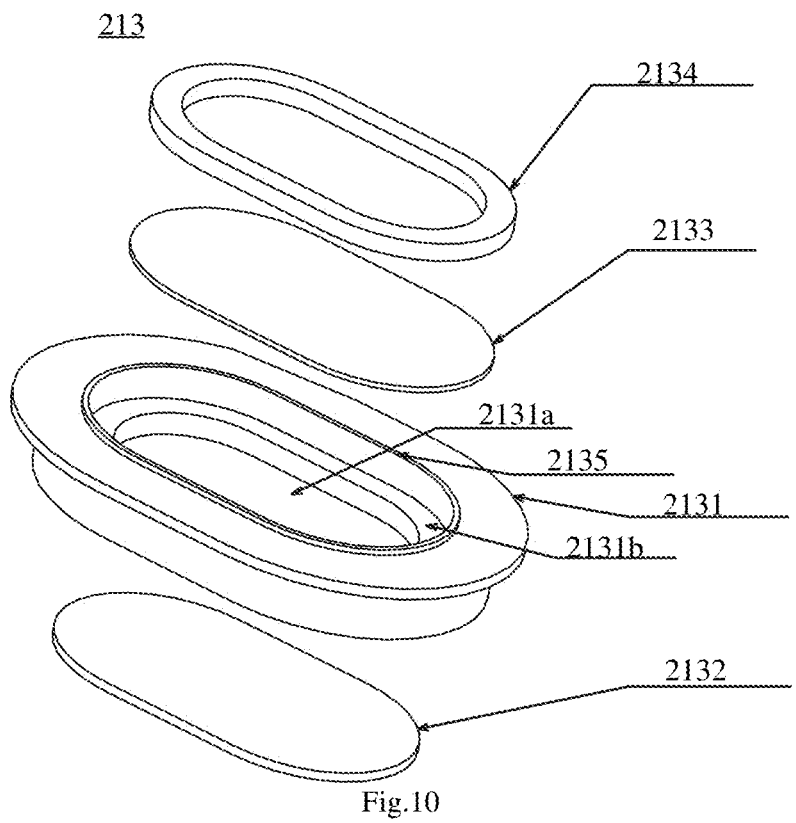
FIG. 10 to FIG. 13 are exploded views of some embodiments of the pressure relief mechanism of the present application.
Figure 11:
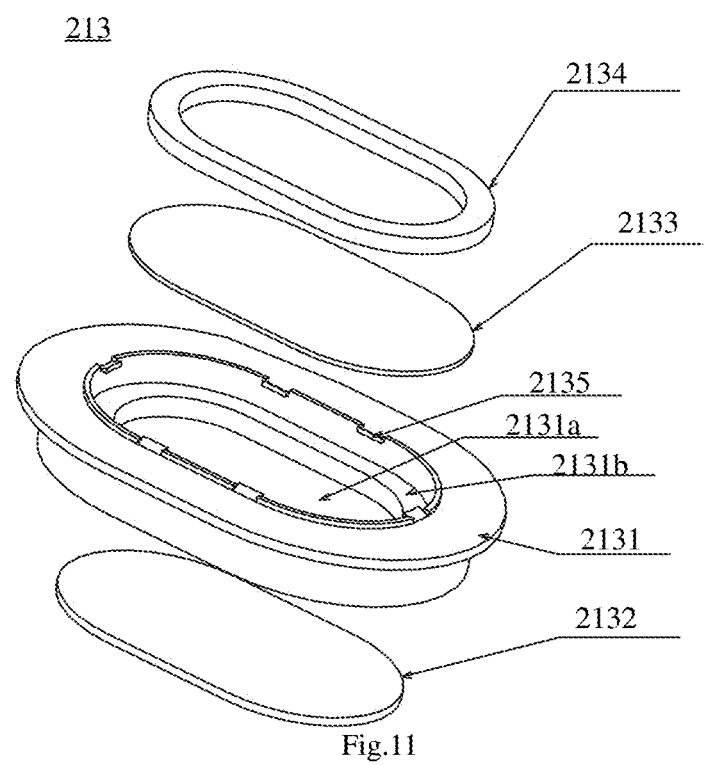

The pressure relief mechanism in the embodiments of the present application will be described in detail below with reference to the accompanying drawings. Specifically, as shown in FIG. 10 and FIG. 11, the pressure relief mechanism 213 arranged on the battery box 21 in the embodiments of the present application may include: a connecting mechanism 2131, a pressure relief sheet 2132, a first protective sheet 2133, a compression ring 2134, and a pressing structure 2135. Specifically, the connecting mechanism includes an aperture 2131a and a first boss 2131b, the first boss 2131b being connected to an inner wall of the aperture 2131a and extending toward an axis of the aperture 2131a. The pressure relief sheet 2132 is arranged on a side of the first boss 2131b, and the first protective sheet 2133 is arranged on the other side of the first boss 2131b away from the pressure relief sheet 2132, wherein the pressure relief sheet 2132 is configured to be actuated to release an internal pressure of the battery box when the internal pressure reaches a threshold, and the first protective sheet 2133 is configured to protect the pressure relief sheet 2132. For the side of the first boss 2131b where the first protective sheet 2133 is provided, the side of the first protective sheet 2133 away from the first boss 2131b is provided with a compression ring 2134 for pressing the first protective sheet 2133. The pressing structure 2135 is connected to the connecting mechanism and is capable of being pressed to the axial direction of the aperture 2131a to press the compression ring 2134, wherein FIG. 10 is a schematic diagram of the pressing structure before being pressed, and FIG. 11 is a schematic diagram of the pressing structure after being pressed.

Considering that the electrode terminals are generally arranged on the cover plate 212, if the pressure relief mechanism 213 is also arranged on the cover plate, when thermal runaway occurs inside the battery cell, the pressure relief mechanism is fractured, and a liquid or solid combustible material, which may also contain a conductive material, will be sprayed out while the internal gas pressure of the battery cell is released, resulting in short circuit between the electrode terminals. Moreover, considering that the electrode terminals are generally directed upward, that is, toward a passenger, when the battery is installed in a vehicle, if the pressure relief mechanism 213 is installed on the same side of the electrode terminals, gas flow and other materials released after the pressure relief mechanism 213 is fractured will be discharged upward, which may cause burn or scald of the passenger, increasing the risk of the passenger. Therefore, the pressure relief mechanism 213 in the embodiments of the present application may be arranged on the bottom wall or the side wall of the housing 211 of the battery box 21. For example, the pressure relief mechanism 213 after being installed may be as shown in FIG. 8.

As such, in the pressure relief mechanism of the embodiments of the present application, a protective sheet is arranged on a side of the pressure relief sheet close to the inside of the battery box, such that when the pressure relief sheet is used on the battery box, it may prevent the pressure relief sheet from directly contacting an electrolytic solution in the battery box, thereby reducing the corrosion of the pressure relief sheet by the electrolytic solution, and also alleviating the impact of the electrolytic solution on the pressure relief sheet. In addition, during the installation process, by providing a boss on the inner wall of the aperture of the connecting mechanism, and arranging the protective sheet and the pressure relief sheet on both sides of the boss, respectively, the pressure relief mechanism may be installed at the same time on both sides to simplify the installation process. For the side where the protective sheet is installed, the protective sheet may be pressed by the compression ring, and then the compression ring is pressed by the pressing structure. The overall structure is simple and is easy to operate.

Figure 12:
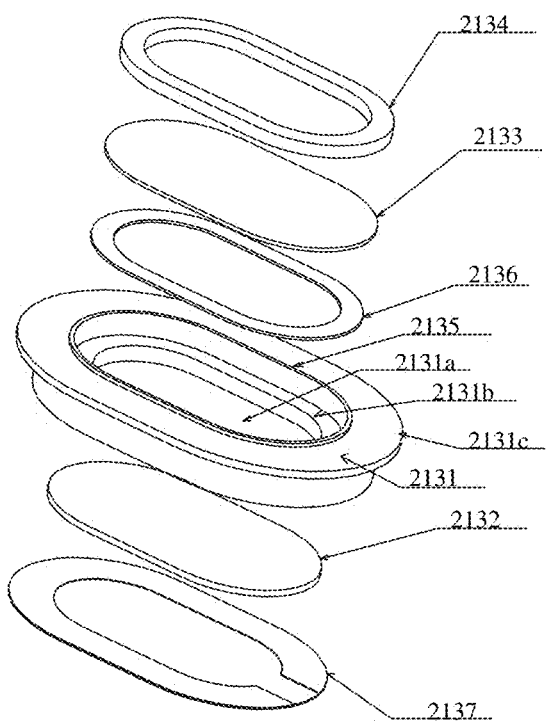
Figure 13:
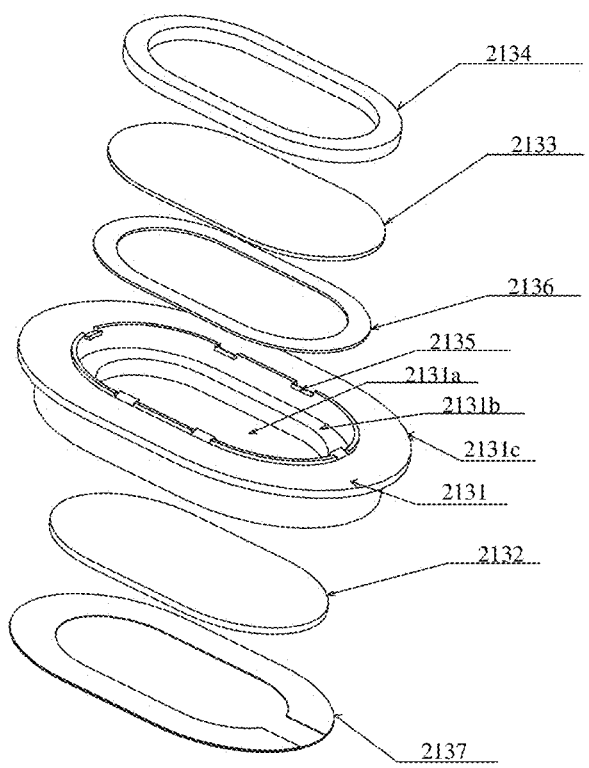

In addition, considering that when the pressure relief mechanism 213 is installed on the battery box 21, a boss may be provided on the outer side of the pressure relief mechanism 213 in order to facilitate the fixation. Specifically, as shown in FIG. 12 (the pressing structure 2135 in FIG. 12 is before being pressed) to FIG. 13 (the pressing structure 2135 in FIG. 13 is after being pressed), the connecting mechanism 2131 may further include a second boss 2131c. The second boss 2131c is connected to an outer wall of the connecting mechanism 2131 and extends away from the axis of the aperture 2131a. The second boss 2131c is configured to install the pressure relief mechanism on the battery box 21.

Considering that when the pressure relief mechanism 213 is installed, the first protective sheet 2133 is closer to the inside of the battery box 21 than the pressure relief sheet 2132, so as shown in FIG. 10 to FIG. 13, the second boss 2131c may be arranged at an end of the connecting mechanism 2131 close to the pressing structure 2135. As such, when the pressure relief mechanism 213 is installed on a wall of the battery box 21, as shown in FIG. 8, for example, the surface of the pressure relief mechanism 213 close to the inside of the battery box 21 may be substantially flush with the inner surface of the wall where the pressure relief mechanism is located, such that the installation of the components, such as the electrode assembly 22 and the backing plate 24, inside the battery box 21, is not affected, saving the internal space.

In addition, in order to increase the sealing performance of the first protective sheet 2133, a spacer may be provided between the first protective sheet 2133 and the first boss 2131b. Specifically, as shown in FIG. 12 and FIG. 13, the pressure relief mechanism 213 may further include a ring spacer 2136, which is arranged between the first protective sheet 2133 and the first boss 2131b, thus increasing the sealing performance of the first protective sheet 2133.

Considering that when the pressure relief mechanism 213 is installed on the battery box 21, the pressure relief sheet 2132 is away from the inside of the battery box 21 compared with the first protective sheet 2133, or the pressure relief sheet 2132 is located outside the battery box 21, and in order to prevent the pressure relief sheet 2132 from being affected by other components outside the battery box, as shown in FIG. 12 to FIG. 13, the pressure relief mechanism 213 may further include: a second protective sheet 2137 configured to protect the pressure relief sheet 2132. The second protective sheet 2137 is installed on the connecting mechanism 2131 and is located at the side of the pressure relief sheet 2132 away from the first boss 2131b, and covers the pressure relief sheet 2132.

It should be understood that the dimension of the pressure relief mechanism 213 in the embodiments of the present application may be flexibly set according to actual applications. The following description will exemplify the dimensions of the pressure relief mechanism 213 and its various components included in the embodiments of the present application with reference to FIG. 14 to FIG. 22.

Figure 14:
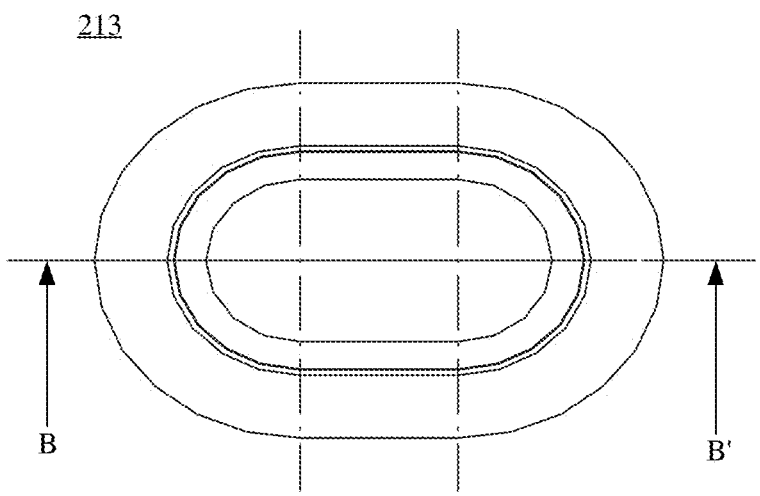
FIG. 14 is a top view of some embodiments of the pressure relief mechanism of the present application.

For example, FIG. 14 is a schematic top view of the pressure relief mechanism 213 before the pressing structure 2135 is not pressed. The shape of the pressure relief mechanism 213 in the embodiments of the present application may be flexibly set according to actual applications. For example, taking the shape of the upper surface of the top view of the pressure relief mechanism as an example, and considering that the housing 211 is a cuboid, if the pressure relief mechanism 213 is arranged on the bottom wall of the housing 211, due to the limitation of the shape of the bottom wall, the pressure relief mechanism 213 may generally be arranged in the shape of a racetrack as shown in FIG. 14. The racetrack shape is similar to an ellipse, with arcs at both ends, but a straight line in the middle. Alternatively, the pressure relief mechanism 213 may also be arranged in other shapes. The embodiments of the present application are not limited thereto.

Figure 15:
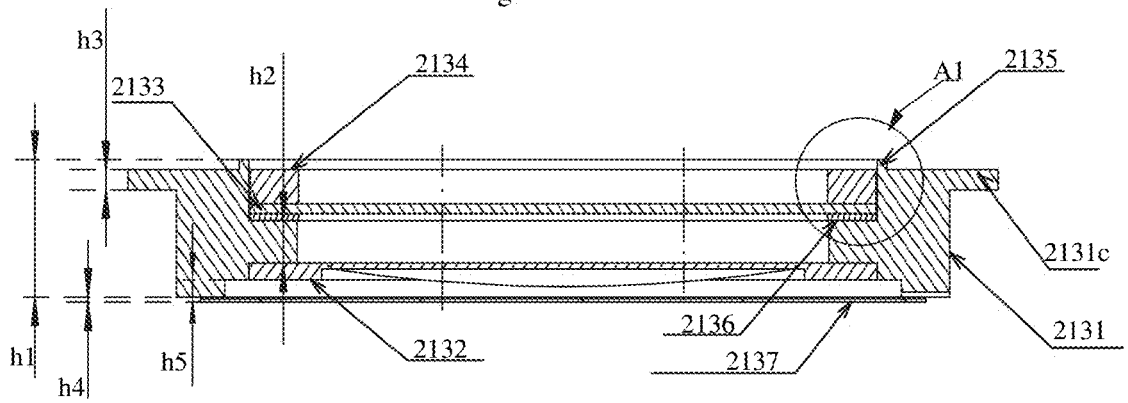
FIG. 15 is a cross-sectional view of some embodiments of the pressure relief mechanism of the present application along a direction B-B'.

FIG. 15 is a cross-sectional view in a direction B-B' shown in FIG. 14. As shown in FIG. 15, for ease of description, it is assumed here that the direction of the pressure relief mechanism 213 is set as shown in FIG. 15. The upper surface and the lower surface described below are subject to the direction shown in FIG. 15, and at this time the top of the pressure relief mechanism 213 in FIG. 15 corresponds to the inside of the battery box 21 when the pressure relief mechanism 213 is installed in the battery box 21, and the bottom of the pressure relief mechanism 213 in FIG. 15 corresponds to the outside of the battery box 21. Here, for example, the second boss 2131c of the pressure relief mechanism 213 is located above, that is, the second boss is located at an end of the connecting mechanism 2131 close to the compression ring 2134. However, the embodiments of the present application are not limited thereto.

Specifically, when the pressure relief mechanism 213 is installed on the housing 211, for example, the pressure relief mechanism is installed on the first wall of the housing 211, and the first wall of the housing 211 is provided with a through hole. The pressure relief mechanism 213 is arranged on the first wall through the connecting mechanism 2131 and is arranged corresponding to the through hole, for being actuated to release the internal pressure of the battery box when the internal pressure reaches a threshold. As for the installation direction of the pressure relief mechanism 213, the pressing structure 2135 is closer to the inside of the housing than the pressure relief sheet 2132. Specifically, taking the installation of the pressure relief mechanism 213 shown in FIG. 15 as an example, a third recess may be provided on the side surface of the first wall close to the inside of the housing 211, that is, the third recess is provided on the outer surface of the first wall. The through hole is arranged on the bottom wall of the third recess, and then the second boss 2131c of the connecting mechanism 2131 is installed on the bottom wall of the third recess, so that the pressure relief mechanism 213 is at least partially contained in the through hole, that is, the lower surface of the second boss 2131c shown in FIG. 15 is in contact with and fixed to the bottom wall of the third recess. At this time, since the opening of the third recess faces the inside of the housing 211, the pressure relief mechanism 213 is installed from the inside of the housing 211, so the installation is more difficult due to the depth of the housing 211.

On the contrary, installing the pressure relief mechanism 213 may also include: providing a sixth recess on the side surface of the first wall away from the inside of the housing 211, that is, providing the sixth recess on the outer surface, and the through hole being provided in the bottom wall of the sixth recess; and then installing the second boss 2131c of the connecting mechanism 2131 on the bottom wall of the sixth recess, so that the pressure relief mechanism 213 is at least partially contained in the through hole. That is, the upper surface of the second boss 2131c in FIG. 15 is in contact with and fixed to the bottom wall of the six recess. At this time, since the opening of the sixth recess faces away from the inside of the housing 211, that is, faces the outside of the housing 211, the pressure relief mechanism 213 is installed from the outside of the housing 211 through the second boss 2131c, which is more convenient for the installation.

As shown in FIG. 15, for the upper surface of the pressure relief mechanism 213 shown in FIG. 15, the upper surface of the connecting mechanism 2131 and the upper surface of the compression ring 2134 may be arranged to be flush. As such, only the pressing structure 2135 protrudes upward on the upper surface of the pressure relief mechanism 213, but the pressing structure 2135 will be pressed and can be flush with the compression ring 2134 after being pressed. That is, when the pressure relief mechanism 213 shown in FIG. 15 is installed on the battery box 21, the upper surface of the pressure relief mechanism 213 may be flush with the inner surface of the battery box 21, so as not to affect the installation of the internal electrode assembly and other components of the battery box.

As shown in FIG. 15, the thickness of the connecting mechanism 2131 may be set according to actual applications. For example, considering that there are many components that need to be installed on the connecting mechanism 2131, the thickness h1 of the connecting mechanism 2131 along the axial direction of the aperture 2131a is generally set to 4.05 mm to 5.05 mm, for example, it may be set to 4.05 mm, 4.55 mm or 5.05 mm, wherein, as shown in FIG. 15, the thickness h1 is the thickness of the thickest region of the connecting mechanism 2131, that is, including the pressing structure 2135 before being pressed. The thickness h2 of the first boss 2131b on the connecting mechanism 2131 may generally be set to 1.25 mm to 1.45 mm, for example, it may be set to 1.25 mm, 1.35 mm or 1.45 mm; for the thickness h3 of the second boss 2131c on the connecting mechanism 2131, it may generally be set to 0.6 mm to 0.9 mm, for example, it may be set to 0.6 mm, 0.8 mm or 0.9 mm.

As shown in FIG. 15, the thickness h4 of the second protective sheet 2137 located below the pressure relief sheet 2132 in the embodiments of the present application may generally be set to 0.1 mm to 0.2 mm, for example, it may be set to 0.1 mm, 0.15 mm or 0.2 mm. The second protective sheet 2137 may be fixed to the side of the connecting mechanism 2131 away from the first boss 2131b of the pressure relief sheet 2132 by gluing, for example, may be fixed to the lower surface of the connecting mechanism 2131. When the pressure relief sheet 2132 is exhausted, a certain amount of opening space is required to make the pressure relief sheet 2132 fractured and opened, so a gap needs to be provided between the surface of the second protective sheet 2137 toward the pressure relief sheet 2132 and the surface of the pressure relief sheet 2132 toward the second protective sheet 2137. For example, the size h5 of the gap may generally be set to be greater than or equal to 0.5 mm, for example, it may be set to 0.5 mm, 1 mm or 2 mm. As such, the pressure relief sheet 2132 can also be protected to prevent the pressure relief sheet 2132 from being squeezed by the components in the battery when the battery cell is assembled into a battery.

Figure 16:
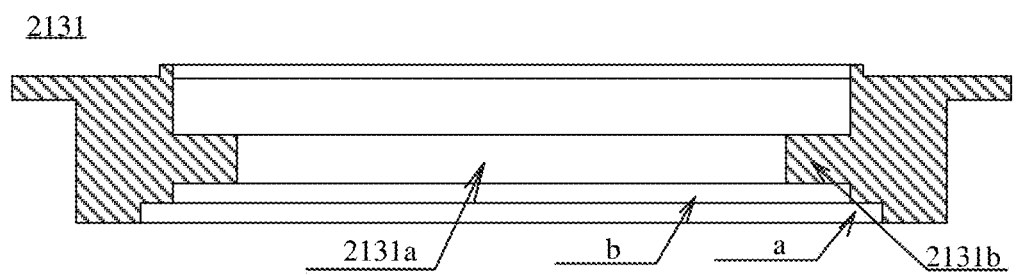
FIG. 16 is a schematic diagram of a connecting mechanism in FIG. 15.

In order to arrange the gap between the pressure relief sheet 2132 and the second protective sheet 2137, a recess may be provided on the lower surface of the connecting mechanism 2131. Specifically, FIG. 16 shows a schematic diagram of the connecting mechanism 2131 in FIG. 15. As shown in FIG. 16, a fourth recess a is provided on a side surface of the connecting mechanism 2131 close to the pressure relief sheet 2132, a fifth recess b is provided on the bottom wall of the fourth recess a, and the aperture 2131a of the connecting mechanism 2131 is provided on the bottom wall of the fifth recess b, so that the side of the connecting mechanism 2131 close to the pressure relief sheet 2132 is formed with a step structure. As such, the bottom wall of the fifth recess b is a side surface of the first boss 2131b for arranging the pressure relief sheet 2132, and the depth of the fifth recess b may be set to be equal to the thickness of the pressure relief sheet 2132. In contrast, as shown in FIG. 15, the lower surface of the pressure relief sheet 2132 may be flush with the surface of the bottom wall of the fourth recess a. At this time, the depth of the fourth recess a is equal to the separation distance between the pressure relief sheet 2132 and the second protective sheet 2137 below.

Figure 17:
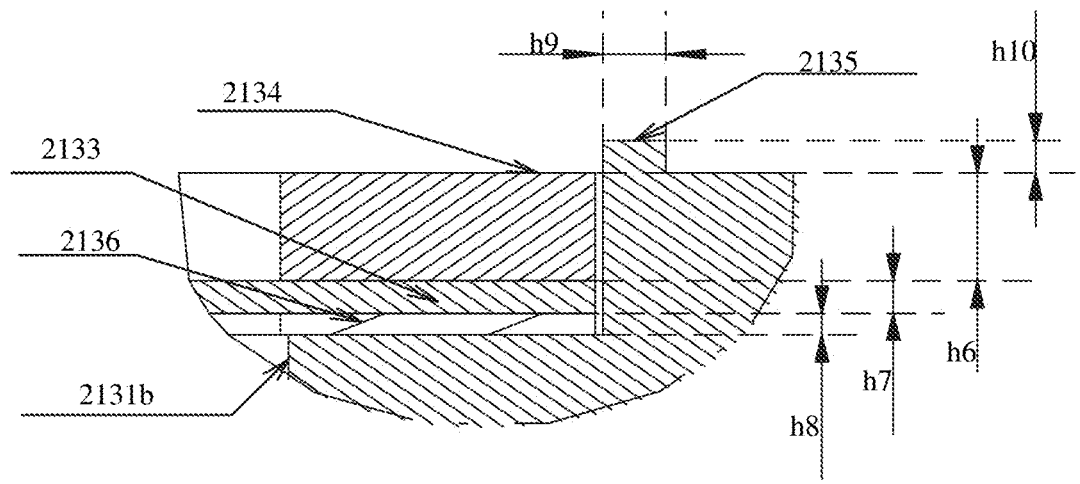
FIG. 17 is an enlarged view of a region A1 in FIG. 15.

FIG. 17 is a partial enlarged view of the region A1 shown in FIG. 15. As shown in FIG. 17, the thickness h6 of the compression ring 2134 in the embodiments of the present application may generally be set to 1 mm to 1.2 mm, for example, it may be set to 1 mm, 1.1 mm, or 1.2 mm. The thickness h7 of the first protective sheet 2133 in the embodiments of the present application may generally be set to 0.3 mm to 0.5 mm, for example, it may be set to 0.3 mm, 0.4 mm, or 0.5 mm. The thickness h8 of the ring spacer 2136 in the embodiments of the present application may generally be set to 0.2 mm to 0.4 mm, for example, it may be set to 0.2 mm, 0.3 mm, or 0.4 mm. For the pressing structure 2135 in the embodiments of the present application, the pressing structure 2135 may be a protrusion structure protruding upward relative to the upper surface of the pressure relief mechanism 213 before being pressed. As shown in FIG. 17, the shape of the protrusion structure may be flexibly set according to actual applications. For example, here taking the protrusion structure of a cuboid as an example, the length h9 of the pressing structure 2135 may generally be set to 0.4 mm to 0.6 mm, for example, it may be set to 0.4 mm, 0.5 mm or 0.6 mm; and the protrusion height h10 of the pressing structure 2135 relative to the upper surface of the connecting mechanism 2131, in other words, the protrusion height h10 of the pressing structure 2135 relative to the side surface of the connecting mechanism 2131 close to the compression ring 2134, may generally be set to 0.3 mm to 0.5 mm, for example, it may be set to 0.3 mm, 0.4 mm or 0.5 mm.

Figure 18:
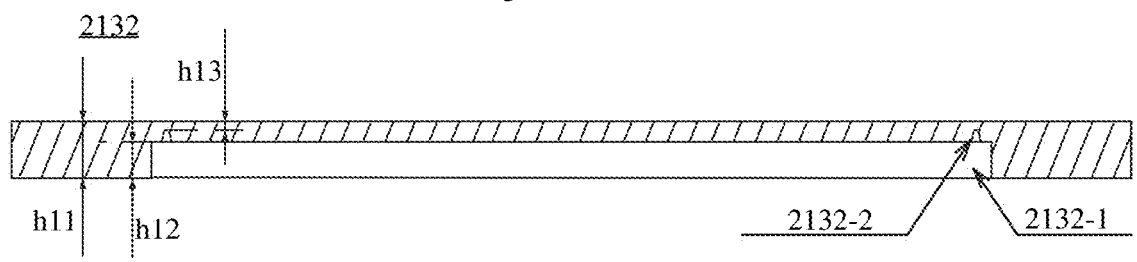
FIG. 18 is a schematic diagram of a pressure relief sheet in FIG. 15.

The dimension of the pressure relief sheet 2132 in the embodiments of the present application will be introduced below. The pressure relief sheet 2132 in the embodiments of the present application may be fixed to one side of the first boss 2131b by welding, for example, laser welding may be used. In addition, the pressure relief sheet 2132 may use a uniform sheet-shaped structure. Alternatively, considering that when thermal runaway occurs inside the battery cell, in order to make the pressure relief sheet 2132 fractured more easily, an indentation may be added to the surface of the pressure relief sheet 2132, that is, a recess region is provided on the surface of the pressure relief sheet 2132. The thickness within the recess is thinner, such that the pressure relief mechanism may be fractured at the recess, so as to achieve more precise directional fracture and exhaust. In addition, considering the ease of installation, the connection between the pressure relief sheet and the connecting mechanism should not be designed to be too thin, so a plurality of recesses may be provided on the pressure relief sheet 2132. Specifically, FIG. 18 shows a schematic diagram of the pressure relief sheet 2132. As shown in FIG. 18, a first recess 2132-1 may be provided on the upper surface and/or the lower surface of the sheet-shaped pressure relief sheet 2132. FIG. 18 takes the first recess 2132-1 being provided on the lower surface of the pressure relief sheet 2132 as an example, corresponding to FIG. 15, that is, a side surface of the pressure relief sheet 2132 away from the first protective sheet 2133 and/or a side surface of the pressure relief sheet close to the first protective sheet 2133 may be provided with a first recess. Further, a second recess 2132-2 may be provided on the bottom wall of the first recess 2132-1, for example, as shown in FIG. 18, so that when the internal pressure of the battery box 21 reaches a threshold, the pressure relief sheet 2132 fractures at the second recess 2132-2 to release the internal pressure, wherein, the bottom wall of the recess in the embodiments of the present application refers to the wall opposite the opening of the recess, and the side wall of the recess refers to the wall adjacent to the opening.

In order to make the pressure relief sheet 2132 fractured more easily when thermal runaway occurs inside the battery cell, an indentation may be added to the surface of the pressure relief sheet 2132, that is, the region of the second recess 2132-2 is provided on the surface of the pressure relief sheet 2132. The thickness within the second recess 2132-2 is thinner, the second recess 2132-2 may make the pressure relief sheet 2132 fractured at a predetermined position to release the internal pressure, that is, the fracture position of the pressure relief sheet 2132 is more precise, and the directional fracture may be achieved.

It should be understood that the first recess in the embodiments of the present application is generally provided on a side surface of the pressure relief sheet 2132 away from the first protective sheet 2133. This is because considering that during installation, the side of the pressure relief sheet 2132 close to the first protective sheet 2133 faces the inside of the battery box 21. If the recess is arranged on this side, since there is the electrolytic solution in the battery box 21, if the sealing of the first protective sheet 2133 is not good enough, the electrolytic solution may enter between the first protective sheet 2133 and the pressure relief sheet 2132, thereby accumulating in the recess on the surface of the pressure relief sheet 2132, and corroding the recess portion, which may cause the pressure relief sheet 2132 to fracture prematurely. Therefore, the recess is generally provided on the side of the pressure relief sheet 2132 away from the first protective sheet 2133, which can alleviate the corrosion of the electrolytic solution.

As shown in FIG. 18, the thickness h11 of the pressure relief sheet 2132 in the embodiments of the present application may generally be 0.3 mm to 1 mm, for example, it may be set to 0.3 mm, 0.5 mm, or 1 mm. The depth h12 of the first recess 2132-1 may generally be set to 0.2 mm to 0.4 mm, for example, it may be set to 0.2 mm, 0.3 mm or 0.4 mm. The thickness h13 of the pressure relief sheet 2132 at the second recess 2132-2 may generally be set to 0.08 mm to 0.15 mm, for example, it may be set to 0.08 mm, 0.1 mm or 0.15 mm. In addition, the shapes of the bottom wall of the first recess and the bottom wall of the second recess may be set according to actual applications. For example, the bottom wall of the first recess may be set to be circular, and the bottom wall of the second recess may be of a rectangular, circular or semi-circular shape, or may be of other patterns. The embodiments of the present application are not limited thereto.

Figure 19:
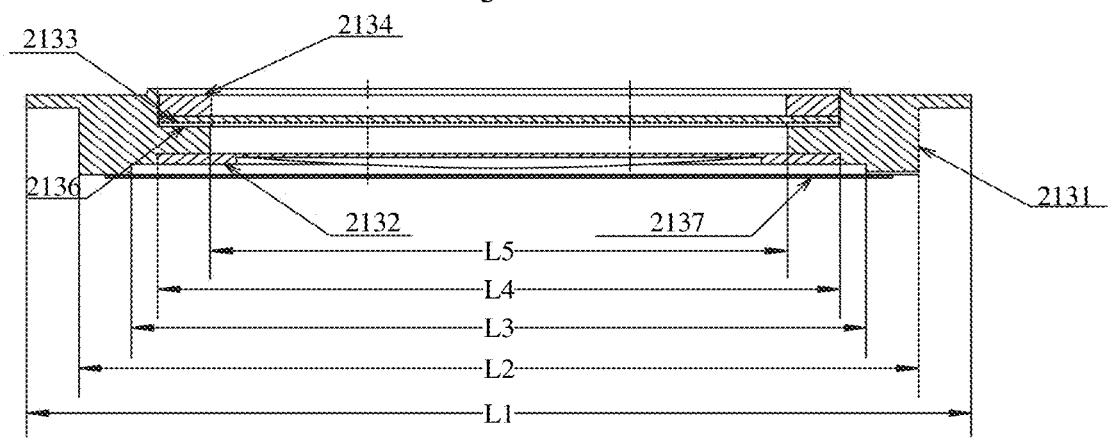
FIG. 19 is a cross-sectional view of other embodiments of the pressure relief mechanism of the present application along the direction B-B'.

It should be understood that the above descriptions mainly introduce the relevant dimensions of the pressure relief mechanism 213 in the embodiments of the present application in the thickness direction. The other dimensions of the pressure relief mechanism 213 may also be set reasonably according to actual applications. For example, the shape of the pressure relief mechanism 213 shown in FIG. 14 is still taken as an example here. FIG. 19 is consistent with FIG. 15 and is also a cross-sectional view in the direction B-B'. As shown in FIG. 19, the overall area of the pressure relief mechanism 213 may generally be set to 400 mm2 to 1500 mm2, for example, it may be set to 400 mm2, 1000 mm2 or 1500 mm2. The overall length L1 of the pressure relief mechanism 213 may generally be set to 36 mm to 68 mm, for example, it may be set to 36 mm, 50 mm or 68 mm. Excluding the part of the second boss 2131c protruding from the periphery of the pressure relief mechanism 213, the length L2 is generally set to 32 mm to 64 mm, for example, it may be set to 32 mm, 45 mm or 64 mm. According to the above contents, in order to facilitate the installation of the pressure relief sheet 2132, a fourth recess may be provided on the lower surface of the connecting mechanism 2131. The corresponding length L3 of the fourth recess is generally 28 mm to 60 mm, for example, it can be set to 28 mm, 40 mm or 60 mm. A fifth recess is provided in the fourth recess to install a pressure relief sheet 2132 on the bottom wall of the fifth recess. The area of the pressure relief sheet 2132 may generally be set to 200 mm2 to 1300 mm2, for example, it may be set to 200 mm2, 750 mm2 or 1300 mm2. The length L4 of the pressure relief sheet 2132 may generally be set to 26 mm to 58 mm, for example, it may be set to 26 mm, 40 mm or 58 mm. At the first boss 2131b, the length L5 of the aperture 2131a of the connecting mechanism 2131 may generally be set to 22 mm to 54 mm, for example, it may be set to 22 mm, 40 mm or 54 mm. However, the embodiments of the present application are not limited thereto. In the embodiments of the present application, "mm2" means square millimeter.

The above describes the relevant contents of the pressure relief mechanism 213 of the embodiments of the present application before the pressing structure 2135 is not pressed with reference to FIG. 14 to FIG. 19. The following will describe the relevant contents of the pressure relief mechanism 213 of the embodiments of the present application after the pressing structure 2135 is pressed with reference to FIG. 20 to FIG. 22.

Figure 20:
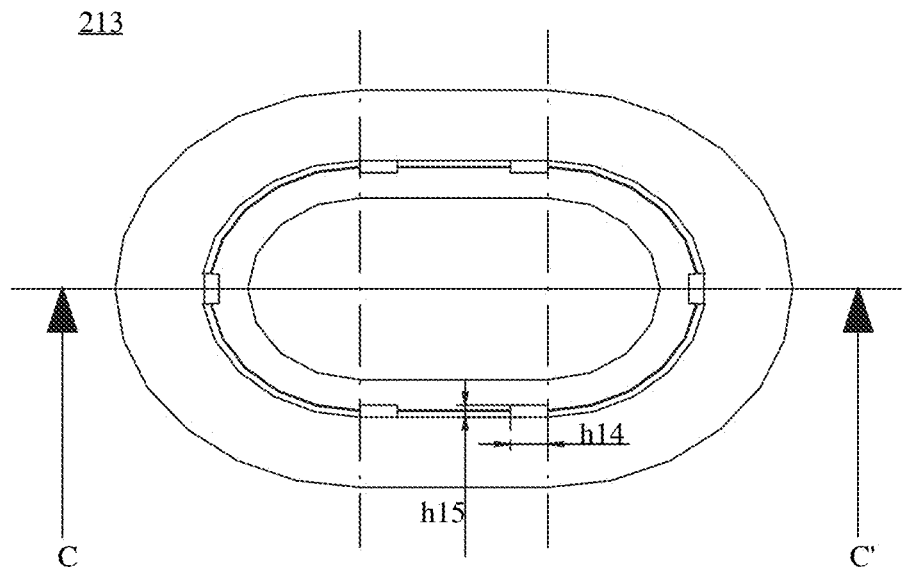
FIG. 20 is a top view of other embodiments of the pressure relief mechanism of the present application.
Figure 21:
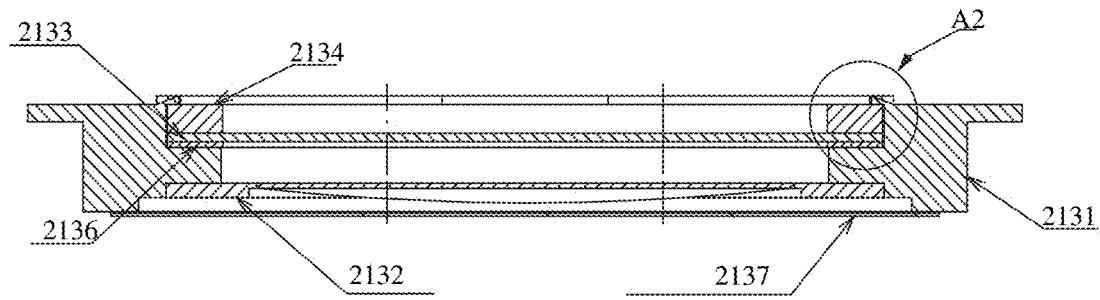
FIG. 21 is a cross-sectional view taken in a direction C-C' in FIG. 20.

Specifically, FIG. 20 is a top view of the pressure relief mechanism 213 shown in FIG. 13 after the pressing structure 2135 is pressed; FIG. 21 is a cross-sectional view in the direction D-D' shown in FIG. 20, that is, FIG. 21 is a cross-sectional view of the pressure relief mechanism 213 after the pressing structure 2135 is pressed.

The pressing structure 2135 in the embodiments of the present application may include at least one protrusion structure, and the at least one protrusion structure is arranged on a side surface of the connecting mechanism 2131 close to the compression ring 2134 and protrudes toward a direction away from the compression ring 2134. The pressing structure 2135 may extend toward the axis of the aperture 2131a relative to the inner wall of the aperture 2131a after being pressed. Generally, the pressing structure 2135 may be arranged to include a plurality of protrusion structures spaced apart from each other. For example, as shown in FIG. 20, here six protrusion structures are provided as an example, and the six protrusion structures may be evenly or symmetrically arranged at the edge of the aperture 2131a of the pressure relief mechanism 213. In this way, when pressing, only the six protrusion structures need to be pressed. Compared with arranging the pressing structure 2135 as a circle of continuous protrusion structures, the pressing process is more convenient and easier to operate. The width of each pressing structure 2135 may be set reasonably according to the size of the pressure relief mechanism 213. For example, as shown in FIG. 20, the width h14 of the pressing structure 2135 may be set to 2 mm to 4 mm, for example, it may be set to 2 mm, 3 mm or 4 mm.

It should be understood that the dimension of the pressing structure 2135 before and after being pressed may be set according to actual applications. For example, before being pressed, the dimension of the pressing structure 2135 as shown in FIG. 17 is taken as an example, and correspondingly, after being pressed, the dimension of the pressing structure 2135 may be as shown in FIG. 20. The distance h15 that the pressing structure 2135 extends to the axis of the aperture 2131a relative to the inner wall of the aperture 2131a may generally be 0.8 mm to 1 mm, for example, it may be set to 0.8 mm, 0.9 mm, or 1 mm.

Figure 22:
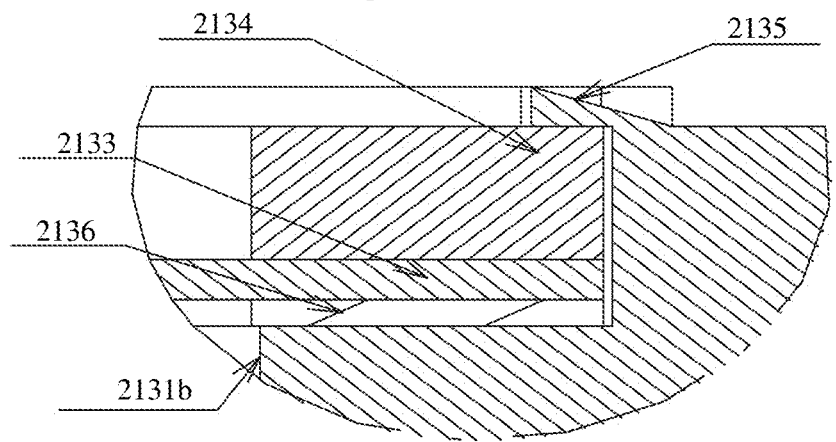
FIG. 22 is an enlarged view of a region A2 in FIG. 21.

As shown in FIG. 21, the pressing structure 2135 is deformed after being pressed, and may become any regular or irregular shape, and after the pressing structure 2135 is deformed, the pressing structure 2135 will extend to the axial direction of the aperture 2131a of the connecting mechanism 2131 to press the compression ring 2134. For example, FIG. 22 is an enlarged view of the region A2 in FIG. 21. As shown in FIG. 22, the pressing structure 2135 may be of a triangle-like shape after being deformed to press the compression ring 2134. However, the embodiments of the present application are not limited thereto.

It should be understood that, in addition to the dimensions of the components in the pressure relief mechanism 213 described above, the material of each component in the embodiments of the present application may also be set according to actual applications. For example, the compression ring 2134 in the embodiments of the present application may generally be an aluminum compression ring. The first protective sheet 2133 in the embodiments of the present application may generally be a PP film, PE or a PET film, but the embodiments of the present application are not limited thereto.

The pressure relief mechanism, the battery box, the battery cell, and the battery of the embodiments of the present application are described above with reference to FIG. 1 to FIG. 22. The method and apparatus for preparing a pressure relief mechanism according to the embodiments of the present application will be described below with reference to FIG. 23 and FIG. 24.

Figures 23, 24:
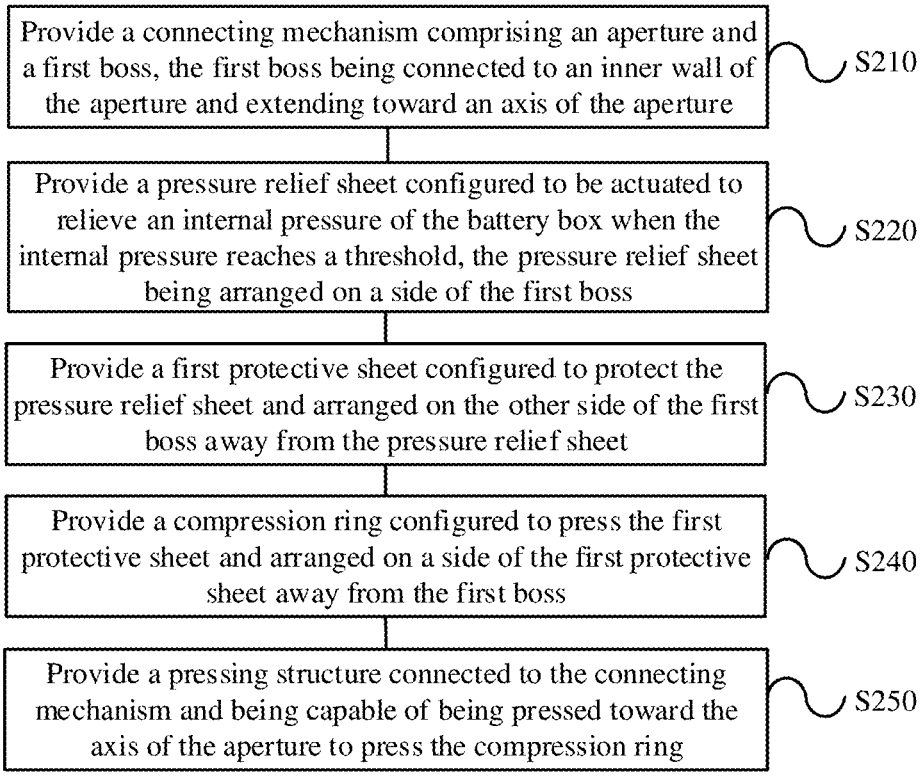
FIG. 23 is a schematic flow chart of some embodiments of a method for preparing a pressure relief mechanism according to the present application.
FIG. 24 is a schematic structural diagram of some embodiments of an apparatus for preparing a pressure relief mechanism according to the present application.

Specifically, FIG. 23 shows a schematic flow chart of a method 200 for preparing a pressure relief mechanism according to an embodiment of the present application. As shown in FIG. 23, the method 200 may include: S210, providing a connecting mechanism, the connecting mechanism including an aperture and a first boss, the first boss being connected to an inner wall of the aperture and extending toward an axis of the aperture; S220, providing a pressure relief sheet for being actuated to release an internal pressure of the battery box when the internal pressure reaches a threshold, the pressure relief sheet being arranged on a side of the first boss; S230, providing a first protective sheet for protecting the pressure relief sheet and arranged on the other side of the first boss away from the pressure relief sheet; S240, providing a compression ring for pressing the first protective sheet and arranged on a side of the first protective sheet away from the first boss; S250, providing a pressing structure connected to the connecting mechanism and being capable of being pressed toward the axis of the aperture to press the compression ring.

Optionally, as an embodiment, the pressing structure includes at least one protrusion structure, and the at least one protrusion structure is arranged on a side surface of the connecting mechanism close to the compression ring and protrudes toward a direction away from the compression ring.

Optionally, as an embodiment, the pressing structure extends toward the axis of the aperture relative to the inner wall of the aperture after being pressed.

Optionally, as an embodiment, the connecting mechanism further includes a second boss, the second boss being connected to an outer wall of the connecting mechanism and extending away from the axis of the aperture, and the second boss being used to install the pressure relief mechanism on the battery box.

It should be understood that the method 200 of the embodiment of the present application may be used to prepare the pressure relief mechanism 213 of the embodiments of the present application, which will not be repeated here for brevity.

It should be understood that, in various embodiments of the present application, the size of the sequence number of the foregoing processes does not mean the order of execution, and the order of execution of the processes should be determined by its function and internal logic, and should not constitute any limitation to the implementation process of the embodiments of the present application.

FIG. 24 shows a schematic block diagram of an apparatus 300 for preparing a pressure relief mechanism according to an embodiment of the present application. As shown in FIG. 24, the apparatus 300 according to the embodiment of the present application includes: a provision module 310, the provision module 310 being used for: providing a connecting mechanism, the connecting mechanism including an aperture and a first boss, the first boss being connected to an inner wall of the aperture and extending toward an axis of the aperture; providing a pressure relief sheet for being actuated to release an internal pressure of the battery box when the internal pressure reaches a threshold, the pressure relief sheet being arranged on a side of the first boss; providing a first protective sheet for protecting the pressure relief sheet and arranged on the other side of the first boss away from the pressure relief sheet; providing a compression ring for pressing the first protective sheet and arranged on a side of the first protective sheet away from the first boss; and providing a pressing structure connected to the connecting mechanism and being capable of being pressed toward the axis of the aperture to press the compression ring.

Optionally, as an embodiment, the pressing structure includes at least one protrusion structure, and the at least one protrusion structure is arranged on a side surface of the connecting mechanism close to the compression ring and protrudes toward a direction away from the compression ring.

Optionally, as an embodiment, the pressing structure extends toward the axis of the aperture relative to the inner wall of the aperture after being pressed.

Optionally, as an embodiment, the connecting mechanism further includes a second boss, the second boss being connected to an outer wall of the connecting mechanism and extending away from the axis of the aperture, and the second boss being used to install the pressure relief mechanism on the battery box.

It should be understood that the apparatus 300 according to the embodiment of the present application may correspond to the execution of the method 200 in the embodiment of the present application, and the foregoing and other operations and/or functions of each unit in the apparatus 300 are respectively intended to implement the corresponding processes of the method 200 in FIG. 23, which will not be repeated here for brevity.

Finally, it should be noted that the above embodiments are merely used for illustrating rather than limiting the technical solutions of the present application. Although the present application is illustrated in detail with reference to the foregoing embodiments, those of ordinary skill in the art should understand that they can still modify the technical solutions described in the foregoing embodiments, or make equivalent substitutions to some of the technical features therein, but these modifications or substitutions can be made to the respective technical solutions without departing from the spirit and scope of the technical solutions of the embodiments of the present application.

What is claimed is:

1. A pressure relief mechanism for a battery box, comprising:
   a connecting mechanism comprising an aperture, a first boss and a second boss,
      wherein the first boss is connected to an inner wall of the aperture and extends toward an axis of the aperture, the first boss and the connecting mechanism formed as the same component,
      wherein the second boss is connected to an outer wall of the connecting mechanism and extends away from the axis of the aperture, the second boss being configured to be connected to the battery box, and
      wherein the first boss comprises:
         a first surface that extends toward the axis of the aperture; and
         a second surface that extends toward the axis of the aperture,
         wherein the second surface opposes the first surface and is separated from the first surface by a thickness of the first boss along the axis of the aperture, and
         wherein the second surface is arranged closer to the second boss along the axis of the aperture than the first surface;
   a pressure relief sheet configured to be actuated to release an internal pressure of the battery box when the internal pressure reaches a threshold, the pressure relief sheet being arranged on the first surface of the first boss;
   a first protective sheet arranged on the second surface of the first boss to be closer to the second boss along the axis of the aperture than the pressure relief sheet to thereby protect the pressure relief sheet from contacting an electrolytic solution in the battery box;
   a compression ring configured to press the first protective sheet and arranged on a side of the first protective sheet away from the first boss along the axis of the aperture; and
   a pressing structure connected to a surface of the second boss and configured to be pressed toward the axis of the aperture to press the compression ring toward the second surface of the first boss along the axis of the aperture.

2. The pressure relief mechanism according to claim 1, wherein the pressing structure comprises a plurality of protrusion structures spaced apart from each other.

3. The pressure relief mechanism according to claim 1, wherein a thickness of the first boss is 1.25 mm to 1.45 mm, or a thickness of the pressure relief sheet is 0.3 mm to 1 mm, or a thickness of the first protective sheet is 0.3 mm to 0.5 mm, or a thickness of the compression ring is 1 mm to 1.2 mm.

4. The pressure relief mechanism according to claim 1, wherein a thickness of the connecting mechanism along the axis of the aperture is 4 mm to 5 mm.

5. The pressure relief mechanism according to claim 1, wherein the second boss is located at an end of the connecting mechanism.

6. The pressure relief mechanism according to claim 1, wherein a thickness of the second boss is 0.6 mm to 0.9 mm.

7. The pressure relief mechanism according to claim 1, wherein a side surface of the pressure relief sheet further from the first protective sheet or a side surface of the pressure relief sheet closer to the first protective sheet defines a first recess, a portion of the side surface of the pressure relief sheet defining the first recess further defines a second recess, and the pressure relief sheet is configured to fracture at the second recess to release the internal pressure of the battery box when the internal pressure reaches the threshold.

8. The pressure relief mechanism according to claim 7, wherein the first recess is arranged on the side surface of the pressure relief sheet further from the first protective sheet.

9. The pressure relief mechanism according to claim 7, wherein a thickness of the pressure relief sheet at the second recess is 0.08 mm to 0.15 mm, or a depth of the first recess is 0.3 mm.

10. The pressure relief mechanism according to claim 1, further comprising:
    a second protective sheet configured to protect the pressure relief sheet, the second protective sheet being installed on the connecting mechanism and being located at a side of the pressure relief sheet away from the first boss and covering the pressure relief sheet.

11. The pressure relief mechanism according to claim 10, wherein a thickness of the second protective sheet is 0.1 mm to 0.2 mm.

12. The pressure relief mechanism according to claim 10, wherein a gap is provided between a surface of the second protective sheet toward the pressure relief sheet and a surface of the pressure relief sheet toward the second protective sheet, and the gap is greater than or equal to 0.5 mm.

13. The pressure relief mechanism according to claim 1, further comprising:
    a ring spacer being arranged between the first protective sheet and the first boss, and a thickness of the ring spacer is 0.2 mm to 0.4 mm.

14. A battery cell, comprising:
    a battery box comprising a housing, a first wall of the housing being provided with a through hole;
    the pressure relief mechanism according to claim 1, the pressure relief mechanism being arranged on the first wall through the connecting mechanism and being arranged corresponding to the through hole, so as to be actuated to release the internal pressure of the battery box when the internal pressure reaches the threshold; and
    an electrode assembly arranged in the battery box.

15. A battery, comprising:
a plurality of battery cells, the plurality of battery cells comprising at least one of the battery cell according to claim 14;
a bus component configured to achieve electrical connection among the plurality of battery cells; and
a case configured to contain the plurality of battery cells and the bus component.

* * * * *